US012623420B2

(12) United States Patent
Strand et al.

(10) Patent No.: US 12,623,420 B2
(45) Date of Patent: May 12, 2026

(54) PROCESS FOR MAKING RECYCLABLE COPOLYESTERS ARTICLES WITH LIVING HINGES

(71) Applicant: Eastman Chemical Company, Kingsport, TN (US)

(72) Inventors: Marc Alan Strand, Kingsport, TN (US); Matthew Clement Storey, Kingsport, TN (US); Aaron David Grills, Kingsport, TN (US); Mark Allen Peters, Telford, TN (US)

(73) Assignee: Eastman Chemical Company, Kingsport, TN (US)

( * ) Notice: Subject to any disclaimer, the term of this patent is extended or adjusted under 35 U.S.C. 154(b) by 177 days.

(21) Appl. No.: 18/708,398

(22) PCT Filed: Nov. 17, 2022

(86) PCT No.: PCT/US2022/050197
§ 371 (c)(1),
(2) Date: May 8, 2024

(87) PCT Pub. No.: WO2023/091544
PCT Pub. Date: May 25, 2023

(65) Prior Publication Data
US 2026/0070293 A1     Mar. 12, 2026

Related U.S. Application Data

(60) Provisional application No. 63/264,413, filed on Nov. 22, 2021.

(51) Int. Cl.
| | |
|---|---|
| *B29D 22/00* | (2006.01) |
| *C08G 63/199* | (2006.01) |
| *C08G 63/672* | (2006.01) |
| *C08J 5/18* | (2006.01) |
| *B29K 67/00* | (2006.01) |

(52) U.S. Cl.
CPC ......... *B29D 22/003* (2013.01); *C08G 63/199* (2013.01); *C08G 63/672* (2013.01); *C08J 5/18* (2013.01); *B29K 2067/003* (2013.01); *C08J 2367/02* (2013.01)

(58) Field of Classification Search
CPC ........ B29D 22/003; C08J 5/18; C08G 63/199; C08G 63/672
See application file for complete search history.

(56) References Cited

U.S. PATENT DOCUMENTS

| | | |
|---|---|---|
| 2,720,507 A | 10/1955 | Caldwell |
| 3,037,050 A | 5/1962 | Erlenback et al. |
| 3,321,510 A | 5/1967 | Obernburg et al. |
| 3,426,754 A | 2/1969 | Bierenbaum et al. |
| 3,772,405 A | 11/1973 | Hamb |
| 3,776,945 A | 12/1973 | Ligorati et al. |
| 3,944,699 A | 3/1976 | Mathews et al. |
| 4,138,459 A | 2/1979 | Brazinsky et al. |
| 4,259,478 A | 3/1981 | Jackson, Jr. et al. |
| 4,582,752 A | 4/1986 | Duncan |
| 4,632,869 A | 12/1986 | Park et al. |
| 4,770,931 A | 9/1988 | Pollock et al. |
| 5,051,528 A | 9/1991 | Naujokas et al. |
| 5,176,954 A | 1/1993 | Keller et al. |
| 5,298,530 A | 3/1994 | Gamble et al. |
| 5,372,864 A | 12/1994 | Weaver et al. |
| 5,384,377 A | 1/1995 | Weaver et al. |
| 5,414,022 A | 5/1995 | Toot, Jr. et al. |
| 5,432,203 A | 7/1995 | DeBruin et al. |
| 5,435,955 A | 7/1995 | Kamei et al. |
| 5,559,159 A | 9/1996 | Sublett et al. |
| 5,576,456 A | 11/1996 | Gamble et al. |
| 5,635,584 A | 6/1997 | Ekart et al. |
| 5,654,347 A | 8/1997 | Khemani et al. |
| 5,696,176 A | 12/1997 | Khemani et al. |
| 5,843,578 A | 12/1998 | Sasaki et al. |
| 5,945,460 A | 8/1999 | Ekart et al. |
| 6,004,664 A | 12/1999 | Sasaki et al. |
| 6,068,910 A | 5/2000 | Flynn et al. |
| 6,262,294 B1 | 7/2001 | Sako et al. |
| 6,287,680 B1 | 9/2001 | Sasaki et al. |
| 6,500,533 B1 | 12/2002 | Kong et al. |
| 6,551,688 B2 | 4/2003 | Moskala et al. |

(Continued)

FOREIGN PATENT DOCUMENTS

| | | |
|---|---|---|
| EP | 0 214 859 B1 | 5/1991 |
| EP | 0 581 970 B1 | 8/1998 |

(Continued)

OTHER PUBLICATIONS

Third Party Observation date of notification Jul. 24, 2025 received in EP Application No. 22826754.8.
Third Party Observation date of notification Jul. 18, 2025 received in EP Application No. 22822776.5.
Third Party Observation date of notification Jul. 24, 2025 received in EP Application No. 22826755.5.
Third Party Submission date of notification Jul. 29, 2025 received in U.S. Appl. No. 18/708,376.
Third Party Submission date of notification Jul. 30, 2025 received in U.S. Appl. No. 18/708,362.

(Continued)

*Primary Examiner* — Daniel Mcnally

(74) *Attorney, Agent, or Firm* — Tammye L. Taylor Polk

(57) ABSTRACT

A process for making a fully recyclable packaging article comprising (1) a reclosable lid with a living hinge which comprises a copolyester composition that is recyclable in a PET stream, (2) a container which comprises a copolyester composition that is recyclable in a PET stream; and affixed thereto is (3) a crystallizable shrinkable film or label which comprises a copolyester composition that is recyclable in a PET stream.

20 Claims, No Drawings

(56) References Cited

U.S. PATENT DOCUMENTS

| | | | |
|---|---|---|---|
| 6,551,699 | B1 | 4/2003 | Flynn |
| 6,720,058 | B1 | 4/2004 | Weeks et al. |
| 6,846,440 | B2 | 1/2005 | Flynn et al. |
| 7,297,721 | B2 | 11/2007 | Kulkarni |
| 10,329,393 | B2 | 6/2019 | Shih et al. |
| 12,116,452 | B2 | 10/2024 | Peters et al. |
| 2001/0036545 | A1 | 11/2001 | Nishi et al. |
| 2003/0068453 | A1 | 4/2003 | Kong |
| 2003/0165671 | A1 | 9/2003 | Hashimoto et al. |
| 2003/0170427 | A1 | 9/2003 | Ito et al. |
| 2009/0042024 | A1 | 2/2009 | Fujii et al. |
| 2013/0029068 | A1 | 1/2013 | Treece et al. |
| 2020/0079900 | A1 | 3/2020 | Salazar Hernandez |

FOREIGN PATENT DOCUMENTS

| | | | | |
|---|---|---|---|---|
| EP | 1 993 926 B1 | 5/2011 | | |
| EP | 3 188 977 B1 | 6/2020 | | |
| JP | 61 037827 A | 2/1986 | | |
| JP | 63 193822 A | 8/1988 | | |
| JP | 07224212 A * | 8/1995 | | |
| JP | 1995224212 A † | 8/1995 | | |
| JP | H07 224212 A | 8/1995 | | |
| JP | 2004 181863 A | 7/2004 | | |
| WO | WO 99 67150 A1 | 12/1999 | | |
| WO | WO-2013016118 A1 * | 1/2013 | ......... | B29C 49/0006 |
| WO | WO 2020 076747 A1 | 4/2020 | | |
| WO | WO-2020076749 A1 * | 4/2020 | ............... | C08J 5/18 |
| WO | WO-2020231778 A1 * | 11/2020 | ........... | C08G 63/199 |
| WO | WO-2021048336 A1 * | 3/2021 | ......... | B65D 47/0838 |

OTHER PUBLICATIONS

Association of Plastics Recyclers; "Critical Guidance Protocol for Clear PET Articles with Labels and Closures", dated Nov. 1, 2022; Document No. PET-CG-02; 11 pgs.

Co-pending U.S. Appl. No. 18/708,362, filed May 8, 2024; Strand and Storey.

Co-pending U.S. Appl. No. 18/708,370, filed May 8, 2024; Strand et al.

Co-pending U.S. Appl. No. 18/708,376, filed May 8, 2024; Strand et al.

Leblanc, Rick, "Recycling Polyethylene Terephthalate"; retrieved from https://thebalancesmb.com/recycling-polyethylene-terephthalate-pet-2877869; Apr. 8, 2020; 4 pgs.

Notification of Transmittal of the International Search Report and the Written Opinion of the International Searching Authority, or the Declaration date of mailing Mar. 3, 2023 received in International Application No. PCT/US2022/050190.

Notification of Transmittal of the International Search Report and the Written Opinion of the International Searching Authority, or the Declaration date of mailing Mar. 17, 2023 received in International Application No. PCT/US2022/050193.

Notification of Transmittal of the International Search Report and the Written Opinion of the International Searching Authority, or the Declaration date of mailing Mar. 6, 2023 received in International Application No. PCT/US2022/050195.

Notification of Transmittal of the International Search Report and the Written Opinion of the International Searching Authority, or the Declaration date of mailing Mar. 17, 2023 received in International Application No. PCT/US2022/050197.

Tingting, Chen et al.; "Poly(ethylene glycol-co-1, 4-cyclohexanedimethanol terephthalate) random copolymers: effect of copolymer composition and microstructure on the thermal properties and crystallization behavior"; Royal Society of Chemistry Advances, vol. 5, No. 74; Jan. 1, 2015, pp. 60570-60580.

* cited by examiner

† cited by third party

PROCESS FOR MAKING RECYCLABLE COPOLYESTERS ARTICLES WITH LIVING HINGES

CROSS-REFERENCE TO RELATED APPLICATION(S)

This application is a national stage filing under 35 USC § 371 of International Application Number PCT/US2022/050197, filed on Nov. 17, 2022 which claims the benefit of the filing date to U.S. Provisional Application No. 63/264,413, filed on Nov. 22, 2021, the entire disclosures of which are incorporated by reference herein.

FIELD OF THE INVENTION

The present disclosure relates to a process for making a fully recyclable packaging article comprising (1) a reclosable lid with a living hinge which comprises a RIC1 compatible copolyester composition, (2) a container which comprises a RIC1 compatible copolyester composition; and affixed thereto is (3) a crystallizable shrinkable film or label which comprises a copolyester composition recyclable in a PET stream.

BACKGROUND OF THE INVENTION

There is a commercial need for fully recyclable containers and packaging articles in which each component of the article; the reclosable lid with a living hinge, the container and the film or label is recyclable in a PET stream.

To be considered recyclable, the articles must be transformable at the end of life back into usable polymeric material. Currently, poly(ethylene terephthalate) (PET) is the largest volume thermoplastic with an existing and well-established mechanical recycling stream.

Recycling of post-consumer PET is a complex process that involves separating opaque, colored and transparent components from each other as well as from containers made from different materials (e.g. polyethylene, polypropylene, PVC, etc.). Proper separation is critical as each of these materials can contaminate the PET stream and reduce the quality of the final sorted product. After separation, the clear PET bottles are ground into flake, cleaned, and dried at temperatures between 140° C. and 180° C. The flake may be used directly (for example in strapping and fiber extrusion) or further processed into pellets for film, sheet or bottle applications. For some applications the pellets may be further crystallized and solid-state polymerized at temperatures between 200° C. and 220° C. prior to use. Because of the well-established nature of PET recycling processes, it is desirable for copolyester-based molded articles and containers to be compatible with the existing PET recycle streams.

Historically, lids with living hinges were produced from olefins such as polypropylene and polyethylene which are not compatible with PET recycle streams.

The present disclosure addresses a long felt commercial need for durable molded articles with living hinges produced from copolyester thermoplastic materials that are transparent, as well as clear, tough, flexible and recyclable in a PET stream.

BRIEF SUMMARY OF THE INVENTION

One aspect of the present disclosure is a process for producing three-component recyclable article comprising A) producing component A—a reclosable lid with a living hinge as a single component by injection molding at least one polyester using a mold with one or more injection points wherein the average polyester flow length divided by the average thickness of the lid is below 200; wherein at least one polyester comprises: (a) a dicarboxylic acid component comprising: (i) 88 to 100 mole % of terephthalic acid residues; (ii) 0 to 12 mole % of aromatic and/or aliphatic dicarboxylic acid residues having up to 20 carbon atoms; and (b) a glycol component comprising: (i) 88 to 100 mole % of ethylene glycol residues; and (ii) 0 to 12 mole % of 1,4-cyclohexanedimethanol residues; wherein the total mole % of the acid residues is 100 mole %, and the total mole % of the glycol residues is 100 mole %; wherein the inherent viscosity (IhV) of said polyester ranges from 0.60 to 1.1 dL/g as determined in 60/40 (wt/wt) phenol/tetrachloroethane at a concentration of 0.25 g/50 ml at 25° C.; and wherein the melting point temperature ($T_m$) of said polyester ranges from 225 to 255° C. as determined by ASTM D3418 at a scan rate of 10° C./min; B) producing component B—a container by injection stretch blow molding at least one polyester; wherein at least one polyester comprises: (a) a dicarboxylic acid component comprising: (i) 88 to 100 mole % of terephthalic acid residues; (ii) 0 to 12 mole % of aromatic and/or aliphatic dicarboxylic acid residues having up to 20 carbon atoms; and (b) a glycol component comprising: (i) 88 to 100 mole % of ethylene glycol residues; and (ii) 0 to 12 mole % of 1,4-cyclohexanedimethanol residues; and (c) optionally at least one branching agent in the amount ranging from 0.1 to 1.0 mole % based on the total moles of glycol residues if said branching agent has hydroxyl substituents and otherwise based on the total moles of acid residues; wherein the total mole % of the acid residues is 100 mole %, and the total mole % of the glycol residues is 100 mole %; wherein the inherent viscosity (IhV) of said polyester ranges from 0.60 to 1.1 dL/g as determined in 60/40 (wt/wt) phenol/tetrachloroethane at a concentration of 0.25 g/50 ml at 25° C.; and wherein the melting point temperature ($T_m$) of said polyester ranges from 225 to 255° C. as determined by ASTM D3418 at a scan rate of 10° C./min and C) producing component C—a heat shrinkable film or label from at least one crystallizable resin which comprises a polyester composition comprising: at least one polyester which comprises: (a) a dicarboxylic acid component comprising: (i) about 70 to about 100 mole % of terephthalic acid residues; (ii) about 0 to about mole % of aromatic and/or aliphatic dicarboxylic acid residues having up to carbon atoms; and (b) a diol component comprising: about 75 mole % or greater of ethylene glycol residues and about 25 mole % or less of other glycols comprising one or more of: about 0.1 to less than about 24 mole % of neopentyl glycol residues; 0 to less than about 24 mole % of 1,4-cyclohexanedimethanol residues; about 1 to less than about 10 mole % of total diethylene glycol residues in the final polyester composition; wherein the total mole % of the dicarboxylic acid component is 100 mole %, and wherein the total mole % of the diol component is 100 mole %; or C') producing component C'—a heat shrinkable film or label from at least one crystallizable resin which comprises a blend of polyester compositions comprising: (1) 5-80% of at least one crystallizable polyester which comprises: (a) a dicarboxylic acid component comprising: (i) about 70 to about 100 mole % of terephthalic acid residues; (ii) about 0 to about mole % of aromatic and/or aliphatic dicarboxylic acid residues having up to carbon atoms; and a diol component chosen from either (b) or (b'), wherein (b) is a diol component comprising: about 75 mole % or greater of ethylene glycol residues and about 25 mole % or less of other glycols comprising one or more of: (i) about 0 to less than about 25 mole % of neopentyl glycol residues; (ii) about 0 to less than about 25 mole % of 1,4-cyclohexanedimethanol residues; (iii) about 0 to less than about 10 mole % of total diethylene glycol residues in the final polyester composition; wherein the total mole % of the dicarboxylic acid component is 100 mole %, and wherein the total mole % of the diol component is 100 mole %; or wherein (b') is a diol component comprising: about 75 mole % or greater of ethylene glycol residues and about 25 mole % or less of other glycols comprising one or more of: (i) about 0.1 to less than about 24 mole % of neopentyl glycol residues; (ii) about 0.1 to less than about 24 mole % of 1,4-cyclohexanedimethanol residues; (iii) about 1 to less than about mole % of total diethylene glycol residues in the final polyester composition; wherein the total mole % of the dicarboxylic acid component is 100 mole %, and wherein the total mole % of the diol component is 100 mole %; and (2) 20-95% of at least one amorphous polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: about 60 mole % or greater of ethylene glycol residues and about 40 mole % or less of other glycols comprising one or more of: (i) about 0 to less than about 40 mole % of neopentyl glycol residues; (ii) about 0 to less than about 40 mole % of 1,4-cyclohexanedimethanol residues; (iii) about 0 to less than about 15 mole % of total diethylene glycol residues in the final polyester composition, whether or not formed in situ; wherein the total mole % of the dicarboxylic acid component is 100 mole %, and wherein the total mole % of the diol component is 100 mole %; and wherein (1) and (2) are different.

One embodiment of the present disclosure is the process of the previous aspect further comprising attaching component A—the lid to component B—the container and affixing component C—the film or label onto component B—the container or onto a portion of component B—the container and a portion of component A—the attached lid.

One embodiment of the present disclosure is the process of the previous the aspect and the previous embodiment wherein in A) the average polyester flow length divided by the average thickness of component A—the lid is below 175; or wherein in A) the average polyester flow length divided by the average thickness of component A—the lid is below 150, or wherein in A) the average polyester flow length divided by the average thickness of component A—the lid is below 100.

One embodiment of the present disclosure is the process of the previous aspect and the previous embodiments wherein in A) the mold has one injection point; or wherein in A) the mold has two injection points.

One embodiment of the present disclosure is the process of the previous aspect and the previous embodiments wherein all three components—component A—the lid, component B—the container and component C—the film are transparent and/or clear and recyclable in a PET recycle stream.

One embodiment of the present disclosure is the process of the previous aspect and the previous embodiments wherein component A—the lid produced in A) has an average thickness of from 0.5-2 mm.

One embodiment of the present disclosure is the process of the previous aspect and the previous embodiments wherein component A—the lid produced in A) has a living hinge with an average thickness of from 0.1-1 mm.

In one aspect, the packaging containers and molded articles of the present disclosure are recyclable in a PET recycle stream.

In one embodiment, the packaging containers and molded articles of the of the present disclosure are useful as articles of manufacture chosen from at least one of the following: molded articles, packaging, packaging systems, bottles, films, sheet, containers, medical containers, dental containers, dental floss containers, personal care containers, spice containers, gum and candy containers, food containers, storage containers, beverage containers or cosmetic containers.

In one embodiment, the articles of the present disclosure are useful as films, containers, packaging articles, cosmetics jars, bottles, medical containers, personal care containers, cosmetics containers, molded articles, lids, fragrance caps, medical devices, medical packaging, healthcare supplies, commercial foodservice products, trays, containers, food pans, tumblers, storage boxes, storage containers, bottles, or toys.

The present disclosure pertains to polyester compositions and processes that enable molded articles, reclosable lids and reclosable hinged containers to be produced with living hinges that exhibit improved strength while maintaining the required flexibility. One aspect of the present disclosure relates to a living hinge or a live or flexible hinge. In one embodiment, the living hinge is a one-piece flexing or functional hinge having a flexing zone between the attachment edges. The hinge body has an attachment edge and a flexing zone between the attachment edges defining a flexing axis or pivot. In one embodiment, the lid is a reclosable hinged article. In one embodiment, the reclosable lid and living hinge is a single article. One embodiment of the present disclosure is an injection molded reclosable lid with a living hinge. The lids in the present disclosure can be attached to the containers by any means suitable for the intended application. For example, in one embodiment, the lid is attached by being screwed onto the container. In another embodiment, the lid is snapped or click locked onto the container. In one embodiment, the reclosable lid and the container is a single article. In one embodiment, the reclosable lid and/or the container are multi-layered. The living hinges of the present disclosure have improved reliability, stability, strength and durability that is compatible in performance or better than the convention olefin living hinges.

DETAILED DESCRIPTION

The present disclosure may be understood more readily by reference to the following detailed description of certain embodiments of the disclosure and the working examples. In accordance with the purpose(s) of this disclosure, certain embodiments of the disclosure are described in the Summary of the Invention and are further described herein below. Also, other embodiments of the disclosure are described herein.

The present disclosure pertains to certain copolyester compositions which can produce articles having the following attributes, all of which are becoming increasingly critical to meet market needs: (1) the copolyester compositions are used to make reclosable lids with living hinges; (2) each of the components of the articles—the lids, the containers and the films are recyclable in a PET recycle stream; (3) in some embodiments the articles contain post-consumer recycled (PCR) materials, in the form of rPET or recycled copolyesters or the articles are made from polyesters that contain recycle content such as rEG, rDMT, rDEG or rCHDM; (4) the articles are transparent (low haze); (5) the compositions have a melting temperature (T$_m$) of 225-255° C., so they qualify as PET for recycling purposes and can be recycled at end of life with current, well established PET recycle streams; and (6) the articles include shrink films made from crystallizable resins that have high strain induced crystalline melting points, so they are compatible in PET recycling processes, thus they do not have to be removed during the recycling process, and they do not impact the process.

In one aspect the molded articles of the present disclosure pertain to copolyester-based, environmentally friendly and sustainable articles for durable and consumer-oriented product applications that have two critical attributes. First, the articles of the present disclosure enable the ability to mold articles with transparent, reclosable lids with living hinges. Second, each component (the lid, the container, and the label) of the articles of the present disclosure are compatible in PET recycle streams, i.e. they can be processed under the conditions used for homopolymer PET recycling.

One embodiment of the present disclosure relates to a fully recyclable multi-component packaging article comprising at least (1) a recyclable, reclosable lid with a living hinge which comprises a RIC1 compatible copolyester composition, (2) a recyclable container which comprises a RIC1 compatible copolyester composition; and affixed thereto is (3) a crystallizable shrinkable film or label which comprises a copolyester composition recyclable in a PET stream.

In 2017, California Assembly Bill No. 906-Beverage containers: polyethylene terephthalate was signed into law, and it defines "polyethylene terephthalate" (PET) for purposes of resin code labeling as a plastic that meets certain conditions, including limits with respect to the chemical composition of the polymer and a melting peak temperature within a specified range. AB-906 adds Section 18013 to California's Public Resources Code, which reads, in part: "Polyethylene terephthalate (PET)" means a plastic derived from a reaction between terephthalic acid or dimethyl terephthalate and monoethylene glycol as to which both of the following conditions are satisfied:

a. The terephthalic acid or dimethyl terephthalate and monoethylene glycol reacted constitutes at least 90 percent of the mass of the monomer reacted to form the polymer.

b. The plastic exhibits a melting peak temperature that is between 225 degrees Celsius and 255 degrees Celsius, as determined during the second thermal scan using procedure 10.1 as set forth in ASTM International (ASTM) D3418 with a heating rate of a sample at 10 degrees Celsius per minute."

As such, copolyesters of the present disclosure meet both of the conditions outlined in AB-906, are acceptable for being called "PET", and thus such materials are likely to be compatible in current PET recycle streams. Furthermore, the articles of the present disclosure meet the California (AB 906/ASTM 7611 guidelines for RIC1 definition and they have achieved Association of Plastic Recyclers (APR) Critical Guidance recognition.

The melting points of the copolyester compositions in the present disclosure make them acceptable under this definition as PET, and thus, compatible in the current PET recycle streams.

Thus, in one aspect of the present disclosure, "compatible with PET recycle streams" is defined as exhibiting a melting temperature of 225-255° C. on the first heat DSC scan (at 10-20 C/min scan rate) of a molded article, while also containing 15 wt % or less of glycols and/or acids other than EG, TPA, or DMT (referred to herein as the total wt % of comonomer content).

The molded articles in the present disclosure are also recyclable, and they can be processed with PET recycle streams and end up as a component in the recyclable PET flake leaving the recycling process. As such, they exhibit both good properties as molded articles, and they have high melting points, so they provide superior performance in recycling processes. The molded articles of the present disclosure have melting temperatures and weight percent comonomer content loading consistent with the definitions in the Assembly Bill, thus it is expected that the molded articles of the present disclosure can be processed in standard PET recycle processes, and they do not have to be removed during the recycle process because they will not impact the process.

In one aspect of the present disclosure, the presence of a melting temperature peak is critical for functional adoption as a PET material acceptable for recycling. The articles of the present disclosure exhibit a melting temperature of 225-255° C. and having a total comonomer content in the 0-15 wt % range.

In one embodiment, the articles have a melting temperature (T$_m$) of 225-255° C. In one embodiment, the articles have a melting temperature (T$_m$) of 230-250° C. In another embodiment, the articles have a melting temperature (T$_m$) of 235-245° C. In another embodiment, the articles have a melting temperature (T$_m$) of 230-240° C.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid, for example, p-hydroxybenzoic acid, and the difunctional hydroxyl compound may have an aromatic nucleus bearing 2 hydroxyl substituents, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through an ester group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make a polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make a polyester.

The polyesters used in the present disclosure typically can be prepared from dicarboxylic acids and diols which react in substantially equal proportions and are incorporated into the polyester polymer as their corresponding residues. The polyesters of the present disclosure, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 1,4-cyclohexanedimethanol, based on the total diol residues, means the polyester contains 25 mole % 1,4-cyclohexanedimethanol residues out of a total of 100 mole % diol residues. Thus, there are 25 moles of 1,4-cyclohexanedimethanol residues among every 100 moles of diol residues.

In certain embodiments, terephthalic acid or an ester thereof, for example, dimethyl terephthalate or a mixture of terephthalic acid residues and an ester thereof can make up a portion or all of the dicarboxylic acid component used to form the polyesters useful in the present disclosure. In certain embodiments, terephthalic acid residues can make up a portion or all of the dicarboxylic acid component used to form the polyesters useful in this disclosure. For the purposes of this disclosure, the terms "terephthalic acid" and "dimethyl terephthalate" are used interchangeably herein. In one embodiment, dimethyl terephthalate (DMT) is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used. In one embodiment, the DMT is rDMT.

In addition to terephthalic acid, the dicarboxylic acid component of the polyesters useful in the present disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole % and from 0.01 to 1 mole %. In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-,2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 15 mole %, up to 12 mole %, up to mole %, up to 5 mole % or up to 1 mole % of one or more aliphatic dicarboxylic acids containing 2-20 carbon atoms, for example, cyclohexanedicarboxylic, malonic, succinic, glutaric, adipic, pimelic, suberic, azelaic and/or dodecanedioic dicarboxylic acids. Certain embodiments can also comprise 0 to 15 mole %, 0.01 to 15 mole %, 0 to 12 mole %, 0.01 to 12 mole %, 0 to 10 mole %, 0.01 to 10 mole %, such as 0.1 to 15 mole %, 1 to 15 mole %, 5 to 15 mole %, or 0.1 to 12 mole %, 1 to 12 mole %, 5 to 12 mole %, or 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters and are useful in the present disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, at least a portion of the residues for the dicarboxylic acids and glycols as set forth herein, are derived from recycled monomeric species such as recycled dimethylterephthalate (rDMT), recycled terephthalic acid (rTPA), recycled dimethylisopthalate (rDMI), recycled ethylene glycol (rEG), recycled cyclohexanedimethanol (rCHDM), recycled neopentyl glycol (rNPG), and recycled diethylene glycol (rDEG). Such recycled monomeric species can be obtained from known methanolysis or glycolysis reactions which are utilized to depolymerize various post-consumer recycled polyesters and copolyesters. Similarly, recycled poly(ethylene terephthalate) (rPET) can be utilized as a feedstock (for the dicarboxylic acid and glycol residues) in the manufacturing of the polyesters having recycle content of the present disclosure. Accordingly, in another embodiment, the polyester compositions of this disclosure comprise at least a portion of the dicarboxylic acid residues and/or glycol residues are derived from (i) recycled monomeric species chosen from rDMT, rTPA, rDMI, rEG, rCHDM, rDEG, rNPG and (ii) rPET, In some embodiments, the compositions that are useful as polyester reactants or intermediates in a reaction scheme to provide a recycle content containing copolyester product. In these embodiments, the recycle content compositions derive their recycle content from r-propylene which, in turn, derives its recycle content from r-pyoil. In these embodiments, such recycle content compositions can be chosen from r-isobutyraldehyde, r-isobutyric acid, r-isobutyric anhydride, r-dimethyl ketene, rTMCDn or r-TMCD.

In one embodiment, the glycol component of the copolyester compositions useful in the present disclosure can comprise 1,4-cyclohexanedimethanol. In another embodiment, the glycol component of the copolyester compositions useful in the present disclosure comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the copolyester compositions useful in the present disclosure can comprise 2,2,4,4-tetramethyl-1,3-cyclobutanediol. In another embodiment, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

In one embodiment, the total comonomer content from glycols and acids other than ethylene glycol (EG), terephthalic acid (TPA), or dimethyl terephthalate (DMT) of the copolyester compositions useful in the present disclosure is from 0 to 15 wt %, 0 to 14 wt %, 0 to 12 wt %, 0 to 11 wt %, 0 to 10 wt %, 0 to 8 wt %, 0 to 6 wt %, 0 to 4 wt %, 0 to 3 wt %, 0 to 2 wt %, 1 to 15 wt %, 1 to 14 wt %, 1 to 12 wt %, 1 to 11 wt %, 1 to 10 wt %, 1 to 8 wt %, 1 to 6 wt %, 1 to 5 wt %, 1 to 4 wt %, 1 to 4.5 wt %, 1 to 3.5 wt %, 1 to 3 wt %, 1 to 2 wt %, 2 to 12 wt %, or from 5 to 10 wt %, or from 10 to 15 wt %, or from 2 to 15 wt %, or from 2 to 10 wt %, or from 3 to 15 wt %, or from 3 to 10 wt %, or from 4 to 15 wt %, or from 4 to 12 wt %, 4 to 11 wt %, 4 to 10 wt %, 5 to 12 wt %, 6 to 12 wt %, 2 to 8 wt %, 2 to 12 wt %, or from 3 to 12 wt %, or from 6 to 10 wt %, or from 7 to 15 wt %, or from 7 to 10 wt %, or from 8 to 15 wt %, or from 8 to 10 wt %, or from 9 to 15 wt %, or from 9 to 10 wt %, or from 11 to 15 wt %, 12 to 15 wt %, or from 13 to 15 wt %, 14 to 15 wt %, or from 12 to 15 wt %.

In one embodiment, the glycol component of the copolyester compositions useful in this disclosure can contain 0 to 15 mole % of neopentyl glycol based on the total mole % of the glycol component being 100 mole %. In one embodiment, the glycol component of the copolyester compositions useful in this disclosure can contain 0 to 14 mole % of neopentyl glycol based on the total mole % of the glycol component being 100 mole %. In one embodiment, the glycol component of the copolyester compositions useful in this disclosure can contain 0 to 12 mole % of neopentyl glycol based on the total mole % of the glycol component being 100 mole %. In one embodiment, the glycol component of the copolyester compositions useful in this disclosure can contain 0.1 to 15 mole % of neopentyl glycol based on the total mole % of the glycol component being 100 mole %. In one embodiment, the glycol component of the copolyester compositions useful in this disclosure can contain 0.1 to 12 mole % of neopentyl glycol based on the total mole % of the glycol component being 100 mole %. In one embodiment, the glycol component of the copolyester compositions useful in this disclosure can contain 1 to 12 mole % of neopentyl glycol based on the total mole % of the glycol component being 100 mole %. In one embodiment, the glycol component of the copolyester compositions useful in this disclosure can contain 2 to 12 mole % of neopentyl glycol based on the total mole % of the glycol component being 100 mole %. In one embodiment, the glycol component of the copolyester compositions useful in this disclosure can contain 2 to 10 mole % of neopentyl glycol based on the total mole % of the glycol component being 100 mole %.

In one embodiment, the glycol component of the copolyester compositions useful in this disclosure can contain from 0 to 15 mole %, or from 0 to 14 mole %, or from 0 to 13 mole %, or from 0 to 12 mole %, or from 0 to 10 mole %, or from 0.01 to 15 mole %, or from 0.01 to 14 mole %, or from 0.01 to 13 mole %, or from 0.01 to 12 mole %, or from 0.01 to 11 mole %, or from 0.01 to 10 mole %, or from 0.01 to 9 mole %, or from 0.01 to 8 mole %, or from 0.01 to 9 mole %, or 0.01 to 7 mole %, or from 0.01 to 6 mole %, or from 0.01 to 5 mole %, or from 0.01 to 4.5 mole %, or from 0.01 to 4 mole %, or from 0.01 to 3.5 mole %, or from 0.01 to 3 mole %, or from 0.01 to 2 mole %, or from 0.1 to 15 mole %, or from 0.1 to 14 mole %, or from 0.1 to 13 mole %, or from 0.1 to 12 mole %, or from 0.1 to 10 mole %, or from 0.1 to 8 mole %, 0.1 to 6 mole %, or from 0.1 to 5 mole %, or from 0.1 to 4 mole %, or from 0.1 to 3 mole %, or from 0.1 to 2 mole %, or 0.1 to 4.5 mole %, or from 0.1 to 3.5 mole %, 3.5 to 4.5 mole %, or from 10 to 12 mole %, or from 10 to 15 mole %, or from 2 to 15 mole %, or from 2 to 14 mole %, or 2 to 13 mole %, or from 2 to 12 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 15 mole %, or from 2 to 12 mole %, or from 2 to 10 mole %, or from 2 to 9 mole %, or from 2 to 8 mole %, or from 2 to 7 mole %, or from 2 to 5 mole %, or from 2 to 4 mole %, or from 1 to 7 mole %, or from 1 to 6 mole %, or from 1 to 5 mole %, or from 1 to 4 mole %, or from 1 to 3 mole %, of neopentyl glycol residues, based on the total mole % of the glycol component being 100 mole %.

In one embodiment, the glycol component of the copolyester compositions useful in this disclosure can contain 0 to 15 mole % of 2-methyl-1,3-propanediol (MPDiol) based on the total mole % of the glycol component being 100 mole %. In one embodiment, the glycol component of the copolyester compositions useful in this disclosure can contain from 0 to 15 mole %, or from 0 to 14 mole %, or from 0 to 13 mole %, or from 0 to 12 mole %, or from 0 to 10 mole %, or from 0.01 to 15 mole %, or from 0.01 to 14 mole %, or from 0.01 to 13 mole %, or from 0.01 to 12 mole %, or from 0.01 to 11 mole %, or from 0.01 to 10 mole %, or from 0.01 to 9 mole %, or from 0.01 to 8 mole %, or from 0.01 to 7 mole %, or 0.01 to 6 mole %, or from 0.01 to 5 mole %, or from 0.01 to 4 mole %, or from 0.01 to 3 mole %, or from 0.01 to 2 mole %, or from 0.1 to 15 mole %, or from 0.1 to 14 mole %, or from 0.1 to 13 mole %, or from 0.1 to 12 mole %, or from 0.1 to 11 mole %, or from 0.1 to 10 mole %, or from 5 to 15 mole %, 10 to 12 mole %, or from 9 to 11 mole %, or from 8 to 12 mole %, or from 6 to 12 mole %, or from 3 to 12 mole %, or 4 to 12 mole %, or from 3 to 11 mole %, 4 to 11 mole %, or from 3 to 10 mole %, or from 4 to 10 mole %, or from 2 to 14 mole %, or from 2 to 12 mole %, or 2 to 11 mole %, or from 2 to 4 mole %, or from 2 to 6 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 3 to 6 mole %, or from 3 to 5 mole %, or from 2 to 10 mole %, or from 2 to 9 mole %, or from 2 to 8 mole %, or from 2 to 7 mole %, or from 2 to 5 mole %, or from 2 to 4.5 mole %, or from 1 to 7 mole %, or from 1 to 5 mole %, or from 1 to 4 mole %, of 2-methyl-1,3-propanediol residues, based on the total mole % of the glycol component being 100 mole %.

In one embodiment, the glycol component of the copolyester compositions useful in this disclosure can contain from 0 to 15 mole % of 1,4-cyclohexanedimethanol based on the total mole % of the glycol component being 100 mole %. In one embodiment, the glycol component of the copolyester compositions useful in this disclosure can contain from 0 to 12 mole % of 1,4-cyclohexanedimethanol based on the total mole % of the glycol component being 100 mole %. In one embodiment, the glycol component of the copolyester compositions useful in this disclosure can contain 0.01 to less than 15 mole % of 1,4-cyclohexanedimethanol based on the total mole % of the glycol component being 100 mole %. In one embodiment, the glycol component of the copolyester compositions useful in this disclosure can contain 0.01 to 12 mole % of 1,4-cyclohexanedimethanol based on the total mole % of the glycol component being 100 mole %. In one embodiment, the glycol component of the copolyester compositions useful in this disclosure can contain 0.01 to less than 12 mole % of 1,4-cyclohexanedimethanol based on the total mole % of the glycol component being 100 mole %. In one embodiment, the glycol component of the copolyester compositions useful in this disclosure can contain 0.01 to 5 mole % of 1,4-cyclohexanedimethanol based on the total mole % of the glycol component being 100 mole %. In one embodiment, the glycol component of the copolyester compositions useful in this disclosure can contain 0 to less than 5 mole % of 1,4-cyclohexanedimethanol based on the total mole % of the glycol component being 100 mole %. In one embodiment, the glycol component of the copolyester compositions useful in this disclosure can contain 4 mole % of 1,4-cyclohexanedimethanol based on the total mole % of the glycol component being 100 mole %. In one embodiment, the glycol component of the copolyester compositions useful in this disclosure can contain 4.5 mole % of 1,4-cyclohexanedimethanol based on the total mole % of the glycol component being 100 mole %. In one embodiment, the glycol component of the copolyester compositions useful in this disclosure can contain 3.5 mole % of 1,4-cyclohexanedimethanol based on the total mole % of the glycol component being 100 mole %. In one embodiment, the glycol component of the copolyester compositions useful in this disclosure can contain 3 mole % of 1,4-cyclohexanedimethanol based on the total mole % of the glycol component being 100 mole %.

In one embodiment, the 1,4-cyclohexanedimethanol (CHDM) is rCHDM. In one embodiment, the rCHDM is produced from rDMT.

In one embodiment, the glycol component of the copolyester compositions useful in this disclosure can contain from 0 to 15 mole %, or from 0 to 14 mole %, or from 0 to 13 mole %, or from 0 to 12 mole %, or from 0 to 10 mole %, or from 0.01 to 15 mole %, or from 0.01 to 14 mole %, or from 0.01 to 13 mole %, or from 0.01 to 12 mole %, or from 0.01 to 11 mole %, or from 0.01 to 10 mole %, or from 0.01 to 9 mole %, or from 0.01 to 8 mole %, or from 0.01 to 7 mole %, or 0.01 to 6 mole %, or from 0.01 to 5 mole %, or from 0.01 to 4 mole %, or from 0.01 to 3 mole %, or from 0.01 to 2 mole %, or from 0.1 to 15 mole %, or from 0.1 to 14 mole %, or from 0.1 to 13 mole %, or from 0.1 to 12 mole %, or from 0.1 to 11 mole %, or from 0.1 to 10 mole %, or from 5 to 15 mole %, 10 to 12 mole %, or from 9 to 11 mole %, or from 8 to 12 mole %, or from 6 to 12 mole %, or from 3 to 12 mole %, or 4 to 12 mole %, or from 3 to 11 mole %, 4 to 11 mole %, or from 3 to 10 mole %, or from 4 to 10 mole %, or from 2 to 14 mole %, or from 2 to 12 mole %, or 2 to 11 mole %, or from 2 to 4 mole %, or from 2 to 6 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 3 to 6 mole %, or from 3 to 5 mole %, or from 2 to 10 mole %, or from 2 to 9 mole %, or from 2 to 8 mole %, or from 2 to 7 mole %, or from 2 to 5 mole %, or from 2 to 4.5 mole %, or from 1 to 7 mole %, or from 1 to 5 mole %, or from 1 to 4 mole %, 1,4-cyclohexanedimethanol residues, based on the total mole % of the glycol component being 100 mole %.

In one embodiment, the glycol component of the copolyester compositions useful in this disclosure can contain from 0 to 15 mole %, or from 0 to 14 mole %, or from 0 to 13 mole %, or from 0 to 12 mole %, or from 0 to 11 mole %, or from 0 to 10 mole %, or from 0 to 9 mole %, or from 0 to 8 mole %, or from 0 to 7 mole %, or from 0 to 6 mole %, or from 0 to 5 mole %, or from 0 to 4.5 mole %, or from 0 to 4 mole %, or from 0 to 3.5 mole %, or from 0 to 3 mole %, or from 0 to 2 mole %, or from 0.01 to 15 mole %, or from 0.01 to 14 mole %, or 0.01 to 13 mole %, or from 0.01 to 12 mole %, or from 0.01 to 11 mole %, or from 0.01 to 10 mole %, or from 0.01 to 9 mole %, or from 0.01 to 8 mole %, or from 0.1 to 7 mole %, or from 0.1 to 6 mole %, or from 0.1 to 5 mole %, or from 0.1 to 4.5 mole %, or from 0.1 to 4 mole %, or from 0.1 to 3.5 mole %, or from 0.1 to 3 mole %, or from 0.1 to 2 mole %, or from 1 to 12 mole %, 2 to 12 mole %, or from 1 to 10 mole %, or from 2 to 10 mole %, 1 to 8 mole %, or from 2 to 8 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of 2,2,4,4-tetramethyl-1,3-cyclobutanediol residues, based on the total mole % of the glycol component being 100 mole %.

In one embodiment, the glycol component of the copolyester compositions useful in this disclosure can contain 0 to 12 mole % of 2,2,4,4-tetramethyl·1,3-cyclobutanediol based on the total mole % of the glycol component being 100 mole %. In one embodiment, the glycol component of the copolyester compositions useful in this disclosure can contain 0.01 to less than 12 mole % of 2,2,4,4-tetramethyl-1,3-cyclobutanediol based on the total mole % of the glycol component being 100 mole %. In one embodiment, the glycol component of the copolyester compositions useful in this disclosure can contain 1 to 12 mole % of 2,2,4,4-tetramethyl-1,3-cyclobutanediol based on the total mole % of the glycol component being 100 mole %. In one embodiment, the glycol component of the copolyester compositions useful in this disclosure can contain 2 to less than 12 mole % of 2,2,4,4-tetramethyl-1,3-cyclobutanediol based on the total mole % of the glycol component being 100 mole %. In one embodiment, the glycol component of the copolyester compositions useful in this disclosure can contain 3 to 12 mole % of 2,2,4,4-tetramethyl-1,3-cyclobutanediol based on the total mole % of the glycol component being 100 mole %. In one embodiment, the glycol component of the copolyester compositions useful in this disclosure can contain 4 to less than 12 mole % of 2,2,4,4-tetramethyl-1,3-cyclobutanediol based on the total mole % of the glycol component being 100 mole %. In one embodiment, the glycol component of the copolyester compositions useful in this disclosure can contain 4 mole % of 2,2,4,4-tetramethyl-1,3-cyclobutanediol based on the total mole % of the glycol component being 100 mole %. In one embodiment, the glycol component of the copolyester compositions useful in this disclosure can contain 4.5 mole % of 2,2,4,4-tetramethyl-1,3-cyclobutanediol based on the total mole % of the glycol component being 100 mole %. In one embodiment, the glycol component of the copolyester compositions useful in this disclosure can contain 3 mole % of 2,2,4,4-tetramethyl-1,3-cyclobutanediol based on the total mole % of the glycol component being 100 mole %. In one embodiment, the glycol component of the copolyester compositions useful in this disclosure can contain 4.5 mole % of 2,2,4,4-tetramethyl-1,3-cyclobutanediol based on the total mole % of the glycol component being 100 mole %.

It should be understood that some other glycol residues may be formed in situ during processing. For example, in one embodiment, the total amount of diethylene glycol residues can be present in the copolyesters useful in the present disclosure, whether or not formed in situ during processing or intentionally added, or both, in any amount, for example, 0 to 15 mole %, 0 to 12 mole %, 1 to 15 mole %, from 1 to 12 mole %, or from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from to 12 mole %, or from 5 to 11 mole %, or 5 to 10 mole %, or from 5 to 9 mole %, of diethylene glycol residues, based on the total mole % of the glycol component being 100 mole %.

In one embodiment, the total amount of diethylene glycol (DEG) residues present in the copolyesters useful in the present disclosure, whether or not formed in situ during processing or intentionally added or both, can be from 12 mole % or less, or 10 mole % or less, or 8 mole % or less, or 6 mole % or less, or 5 mole % or less, or 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 0 to 12 mole %, or from 1 to 12 mole %, or from 1 to 10 mole %, or from 1 to 8 mole %, or from 1 to 6 mole %, or from 1 to 5 mole %, or from 1 to 4 mole %, or from 1 to 3 mole %, or from 1 to 2 mole % of diethylene glycol residues, or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to 5 mole %, or in some embodiments there is no intentionally added diethylene glycol residues, based on the total mole % of the glycol component being 100 mole %. In certain embodiments, the copolyester contains no added modifying glycols. In certain embodiments, the diethylene glycol residues in copolyesters can be from 5 mole % or less. It should be noted that any low levels of DEG formed in situ are not included in the total comonomer content from glycols and acids other than EG, TPA or DMT.

In one embodiment, the DEG is rDEG. In one embodiment, the rDEG is produced from rEG.

For all embodiments, the remainder of the glycol component can comprise ethylene glycol residues in any amount based on the total mole % of the glycol component being 100 mole %. In one embodiment, the copolyesters useful in the present disclosure can contain 50 mole % or greater, or 55 mole % or greater, or 60 mole % or greater, or 65 mole % or greater, or 70 mole % or greater, or 75 mole % or greater, or 80 mole % or greater, or 85 mole % or greater, or 90 mole % or greater, or 95 mole % or greater, or 98 mole % or greater, or 99 mole % or greater; or from 88 to 99 mole %, 80 to 99 mole %, 50 to 99 mole %, or from 55 to 90 mole %, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole % of ethylene glycol residues, based on the total mole % of the glycol component being 100 mole %. In one embodiment, the glycol component can comprise 100 mole % of ethylene glycol residues.

In one embodiment, the ethylene glycol is rEG.

In one embodiment, the glycol component of the copolyester compositions useful in the present disclosure can contain up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4.5 mole %, or up to 4 mole %, or up to 3.5 mole %, or up to 3 mole %, or up to 2.5 mole %, or up to 2 mole %, or up to 1.5 mole % or up to 1 mole %, or up to 0.5 mole %, or up to 0.1 mole %, or less of one or more other modifying glycols (other modifying glycols are defined as glycols which are not ethylene glycol, diethylene glycol, neopentyl glycol, 1,4-cyclohexanedimethanol, 2-methyl-1,3-propanediol or 2,2,4,4-tetramethyl-1,3-cyclobutanediol). In certain embodiments, the copolyesters useful in this disclosure can contain 15 mole % or less of one or more other modifying glycols; 12 mole % or less of one or more other modifying glycols; 10 mole % or less of one or more other modifying glycols; 8 mole % or less of one or more other modifying glycols; 5 mole % or less of one or more other modifying glycols; 4 mole % or less of one or more other modifying glycols, or 3 mole % or less of one or more other modifying glycols. In certain embodiments, the copolyesters useful in this disclosure can contain 4.5 mole % or less of one or more other modifying glycols. In certain embodiments, the copolyesters useful in this disclosure can contain 3.5 mole % or less of one or more other modifying glycols. In another embodiment, the copolyesters useful in this disclosure can contain 0 mole % of other modifying glycols. It is contemplated, however, that some other glycol residuals may form in situ so that residual amounts formed in situ are also an embodiment of this disclosure.

In embodiments, the other modifying glycols for use in the copolyesters, if used, as defined herein contain 2 to 20 carbon atoms. Examples of other modifying glycols include, but are not limited to, 1,2-propanediol, 1,3-propanediol, isosorbide, 1,4-butanediol, 1,5-pentanediol, 1,6-hexanediol, p-xylene glycol, polytetramethylene glycol, and mixtures thereof. In one embodiment, isosorbide is another modifying glycol. In another embodiment, the other modifying glycols include, but are not limited to, at least one of 1,3-propanediol and 1,4-butanediol. In one embodiment, 1,3-propanediol and/or 1,4-butanediol can be excluded. If 1,4- or 1,3-butanediol are used, greater than 4 mole % or greater than 5 mole % can be provided in one embodiment. In one embodiment, at least one other modifying glycol is 1,4-butanediol which present in the amount of 0 to 12 mole %.

In some embodiments, the copolyester compositions according to the present disclosure can comprise from 0 to 10 mole %, for example, from 0.01 to 5 mole %, from 0.01 to 1 mole %, from 0.05 to 5 mole %, from 0.05 to 1 mole %, or from 0.1 to 0.7 mole %, or from 0.05 to 2.0 mole %, 0.05 to 1.5 mole %, 0.05 to 1.0 mole %, 0.05 to 0.8 mole %, 0.05 to 0.6 mole %, 0.1 to 2.0 mole %, 0.1 to 1.5 mole %, 0.1 to 1.0 mole %, 0.1 to 0.8 mole %, 0.1 to 0.6 mole %, 0.2 to 2.0 mole %, 0.2 to 1.5 mole %, 0.2 to 1.0 mole %, 0.2 to 0.8 mole %, 0.2 to 0.6 mole %, 0.3 to 2.0 mole %, 0.3 to 1.5 mole %, 0.3 to 1.0 mole %, 0.3 to 0.8 mole %, 0.3 to 0.6 mole %, 0.5 to 2.0 mole %, 0.5 to 1.5 mole %, 0.5 to 1.0 mole %, or 0.5 to 0.8 mole %, based the total mole percentages of either the glycol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the copolyester. In some embodiments, the copolyester(s) useful in the present disclosure can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole % of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the copolyester reaction mixture or blended with the copolyester in the form of a concentrate as described, for example, in U.S. Pat. Nos. 5,654,347 and 5,696,176, whose disclosure regarding branching monomers is incorporated herein by reference.

In one embodiment, branching monomer or branching agents useful in making the copolyesters formed within the context of the present disclosure can be ones that provide branching in the acid unit portion of the copolyester, or in the glycol unit portion, or it can be a hybrid. In some embodiments, some examples of branching agents are polyfunctional acids, polyfunctional anhydrides, polyfunctional glycols and acid/glycol hybrids. Examples include tri- or tetracarboxylic acids and their corresponding anhydrides, such as trimesic acid, pyromellitic acid, and lower alkyl esters thereof and the like, and tetrols such as pentaerythritol. Also, triols such as trimethylopropane or dihydroxy carboxylic acids and hydroxydicarboxylic acids and derivatives, such as dimethyl hydroxy terephthalate, and the like are useful within the context of this disclosure. In one embodiment, trimellitic anhydride is the branching monomer or branching agent.

The copolyesters compositions useful in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In one embodiment, the chain extending agents have epoxide dependent groups. In one embodiment, the chain extending additive can be one or more styrene-acrylate copolymers with epoxide functionalities. In one embodiment, the chain extending additive can be one or more copolymers of glycidyl methacrylate with styrene.

In certain embodiments, chain extenders may be added at the end of the polymerization process or after the polymerization process. If added after the polymerization process, chain extenders can be incorporated by compounding or by addition during conversion processes such as injection molding or extrusion. In certain embodiments, the chain extending agents may be added to the rPET, to the copolyester, or to the blend during or after blending. In some embodiments, the chain extending agents can be incorporated by compounding or by addition during the conversion processes such as injection molding or extrusion.

The amount of chain extender used can vary depending on the specific monomer composition used and the physical properties desired but is generally about 0.05 percent by weight to about 10 percent by weight based on the total weight of the copolyester composition, such as about 0.1 to about 10% by weight or 0.1 to about 5% by weight, 0.1 to about 2% by weight, or 0.1 to about 1% by weight based on the total weight of the copolyester composition. In one embodiment, the copolyester composition comprises 0.05 to 5 percent by weight, of a chain extending agent based on the total weight of the copolyester composition.

In some embodiments, the chain extending agent can also be added during melt processing to build molecular weight through 'reactive extrusion' or 'reactive chain coupling' or any other process known in the art.

In one embodiment, certain copolyester compositions useful in the present disclosure can exhibit a melt viscosity (MV) at a shear rate of 1 radian/sec of greater than 10,000 poise, or greater than 20,000 poise, or greater than 30,000 poise, or greater than 40,000 poise, or greater than 50,000 poise, or greater than 60,000 poise, or greater than 70,000 poise, or greater than 80,000 poise, or greater than 90,000 poise, or greater than 100,000 poise where the melt viscosity is measured at 260° C. and 1 radian/sec using a rotary viscometer such as a Rheometrics Dynamic Analyzer (RDA II). In one embodiment, certain copolyester compositions useful in the present disclosure can exhibit a melt viscosity (MV) at a shear rate of 1 radian/sec of 10,000 poise to 120,000 poise, or of 20,000 poise to 80,000 poise where the melt viscosity is measured at 260° C. and 1 radian/sec using a rotary viscometer such as a Rheometrics Dynamic Analyzer (RDA II).

It is contemplated that copolyester compositions useful in the present disclosure can possess at least one of the inherent viscosity ranges described herein and at least one of the monomer ranges for the copolyester compositions described herein, unless otherwise stated. It is also contemplated that copolyester compositions useful in the present disclosure can possess at least one of the Tg ranges described herein and at least one of the monomer ranges for the copolyester compositions described herein, unless otherwise stated. It is also contemplated that copolyester compositions useful in the present disclosure can possess at least one of the inherent viscosity ranges described herein, at least one of the Tg ranges described herein, and at least one of the monomer ranges for the copolyester compositions described herein, unless otherwise stated.

For embodiments of this disclosure, the copolyester compositions useful in this disclosure can exhibit at least one of the following inherent viscosities as determined in 60/40 (wt/wt) phenol/tetrachloroethane at a concentration of 0.25 g/50 ml at 25° C.: 0.50 to 1.2 dL/g; 0.50 to 1.0 dL/g; 0.50 to 0.90 dL/g; 0.50 to 0.80 dL/g; 0.55 to 1.2 dL/g; 0.55 to 1.0 dL/g; 0.55 to 0.90 dL/g; 0.55 to 0.80 dL/g; 0.58 to 1.2 dL/g; 0.58 to 1.0 dL/g; 0.58 to 0.90 dL/g; 0.58 to 0.80 dL/g; 0.60 to 1.1 dL/g; 0.60 to 0.90 dL/g; 0.60 to 0.80 dL/g; 0.65 to 0.90 dL/g; 0.60 to 0.80 dL/g; 0.70 to 0.80 dL/g; 0.50 to 0.75 dL/g; 0.55 to 0.75 dL/g; 0.58 to 0.75 dL/g; 0.60 to 0.75 dL/g; 0.60 to 0.70 dL/g; 0.58 to 0.70 dL/g; or 0.55 to 0.70 dL/g.

The glass transition temperature (Tg) of the copolyesters compositions is determined using a TA DSC 2920 from Thermal Analyst Instrument at a scan rate of 20° C./min. The value of the glass transition temperature is determined during the second heat.

In certain embodiments, the molded articles of this disclosure comprise copolyester compositions wherein the copolyester has a Tg of 65 to 120° C.; 70 to 115° C.; 70 to 80° C.; 70 to 85° C.; or 70 to 90° C.; or 70 to 95° C.; 70 to 100° C.; 70 to 105° C.; 70 to 110° C.; 80 to 115° C.; 80 to 85° C.; or 80 to 90° C.; or 80 to 95° C.; 80 to 100° C.; 80 to 105° C.; 80 to 110° C.; 90 to 115° C.; 90 to 100° C.; 90 to 105° C.; 90 to 110° C.

In one embodiment, the copolyester compositions useful in this disclosure are clear, essentially clear or visually clear.

The term "visually clear" is defined herein as an appreciable absence of cloudiness, haziness, and/or muddiness, when inspected visually. In one embodiment, the copolyester blend compositions useful in this disclosure are transparent. The term "transparent" is defined herein as an appreciable absence of cloudiness, haziness, and/or muddiness, such that you can see through the material when inspected visually. These terms are used interchangeably herein. In one aspect the terms clear and/or transparent are defined as having low haze. In one embodiment, clear and/or transparent are defined as having a haze value of 20% or less. In one embodiment, clear and/or transparent are defined as having a haze value of 15% or less. In one embodiment, clear and/or transparent are defined as having a haze value of 12% or less. In one embodiment, clear and/or transparent are defined as having a haze value of 10% or less. In one embodiment, clear and/or transparent are defined as having a haze value of 5% or less.

In some embodiment, the copolyester compositions in the present disclosure are fast crystallizing, making them compatible with the PET recycle stream. For example, in one embodiment, the copolyester compositions have a crystallization half-time of about 1 minute to about 20 minutes. For example, in another embodiment, the copolyester compositions have a crystallization half-time of about 3 minutes to about 20 minutes. In one embodiment the copolyester compositions have a crystallization half-time of up to about 20 minutes, or up to about 15 minutes or up to about 10 minutes or up to about 5 minutes. In one embodiment, the copolyester compositions are suitable for use provided that their crystallization half-times are about 3 minutes. In another embodiment, the copolyester compositions are suitable for use provided that their crystallization half-times are about 5 minutes. In another embodiment, the copolyester compositions are suitable for use provided that their crystallization half-times are about 10 minutes. In another embodiment, the copolyester compositions are suitable for use provided that their crystallization half-times are about 15 minutes. In another embodiment, the copolyester compositions are suitable for use provided that their crystallization half-times are about 20 minutes. In another embodiment, the copolyester compositions are suitable for use provided that their crystallization half-times are less than about 20 minutes. In another embodiment, the copolyester compositions are suitable for use provided that their crystallization half-times are less than about 15 minutes. In another embodiment, the copolyester compositions are suitable for use provided that their crystallization half-times are less than about 10 minutes. In another embodiment, the copolyester compositions are suitable for use provided that their crystallization half-times are less than about 5 minutes.

The crystallization half times of the copolyester compositions, as used herein, may be measured using conventional methods. For example, in one embodiment, the crystallization half times were measured using a differential scanning calorimeter (DSC). In these cases, the samples were ramped (20° C./min) to 285° C. and held isothermally for 2 mins. Next, the polymer was quickly dropped to a setpoint temperature (180° C.) and held until crystallization was completed, denoted by a full endothermic heat flow curve. Half times were reported as the time from start of crystallization to the time that half of the peak was formed.

In one embodiment, the copolyester compositions can be produced by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a copolyester. See U.S. Pat. No. 3,772,405 for methods of producing copolyesters, the disclosure regarding such methods is hereby incorporated herein by reference.

In one embodiment, the copolyesters can be produced from chemically recycled monomers (produced by any known methods of depolymerization).

In one aspect of the present disclosure, the copolyester compositions comprise recycle content. In one embodiment, the copolyester compositions are produced from chemically recycled monomers. For example, polyesters are depolymerized to form the monomer units originally used in its manufacture. One commercially utilized method for polyester depolymerization is methanolysis. In methanolysis, the polyester is reacted with methanol to produce a depolymerized polyester mixture comprising polyester oligomers, dimethyl terephthalate ("DMT"), and ethylene glycol ("EG"). Other monomers such as, for example, 1,4-cyclohexanedimethanol ("CHDM") and diethylene glycol may also be present depending on the composition of the polyester in the methanolysis feed stream. Some representative methods for the methanolysis of PET are described in U.S. Pat. Nos. 3,037,050; 3,321,510; 3,776,945; 5,051,528; 5,298,530; 5,414,022; 5,432,203; 5,576,456 and 6,262,294, the contents and disclosure of which are incorporated herein by reference. A representative methanolysis process is also illustrated in U.S. Pat. No. 5,298,530, the contents and disclosure of which is incorporated herein by reference. The '530 patent describes a process for the recovery of ethylene glycol and dimethyl terephthalate from scrap polyester. The process includes the steps of dissolving scrap polyester in oligomers of ethylene glycol and terephthalic acid or dimethyl terephthalate and passing super-heated methanol through this mixture. The oligomers can comprise any low molecular weight polyester polymer of the same composition as that of the scrap material being employed as the starting component such that the scrap polymer will dissolve in the low molecular weight oligomer. The dimethyl terephthalate and the ethylene glycol are recovered from the methanol vapor stream that issues from depolymerization reactor.

Another approach to depolymerize polyesters is glycolysis, in which the polyester is reacted with a glycol such as ethylene glycol or CHDM to produce a depolymerized polyester mixture. U.S. Pat. No. 4,259,478 thus discloses a process comprising heating a polyester in the presence of 1,4-cyclohexanedimethanol to glycolize the polymer, distilling out ethylene glycol from the glycolysis mixture, and polycondensing the glycolysis mixture to form a copolyester of which at least a portion of ethylene glycol units are replaced by 1,4-cyclohexanedimethanol units. Similarly, U.S. Pat. No. 5,635,584 discloses postconsumer or scrap polyester reacted with glycol to produce a monomer or low molecular weight oligomer by depolymerization of the polyester. The monomer or oligomer, as the case may be, is then purified using one or more of a number of steps including filtration, crystallization, and optionally adsorbent treatment or evaporation. The monomer or oligomer thus produced is particularly suitable as a raw material for acid or ester based polyester production of packaging grade polyester material. Because the process includes purification steps, specifications for the previously used polyester material need not be strict.

Another method of reusing scrap polyester is to introduce the scrap into a polymerization process. U.S. Pat. No. 5,559,159 thus discloses previously used poly(ethylene terephthalate) polyester materials and copolymers thereof, and in particular postconsumer polyester materials, depolymerized and repolymerized to produce bottle grade polymer containing up to 75% of the previously used material. The process involves the solubilization and depolymerization of the previously used polyester material in a transesterification and/or mixture polymerization containing dimethylterephthalate, ethylene glycol and transesterification products thereof. U.S. Pat. No. 5,945,460 discloses a process for producing polyester articles, which generates little or no polyester waste. The process provides esterification or transesterification of one or more dicarboxylic acids or their dialkyl esters, polycondensation to produce a high molecular weight polyester, and molding or shaping of the polyester to produce the desired product. Scrap produced during the molding process is recycled back to the esterification or transesterification or polycondensation portion of the process. Optionally, the scrap may also be recycled to intermediate steps prior to the molding operation. U.S. Pat. No. 7,297,721 discloses a process for the preparation of high molecular weight crystalline PET using up to 50% of post consumer recycled PET flakes along with Pure Terephthalic Acid, Isophthalic Acid and ethylene glycol as a virgin raw material, in the presence of a combination of catalysts and additives to obtain an intermediate prepolymer heel having a low degree of polymerization, further subjecting to autoclaving to yield an amorphous melt, followed by solid state polymerization.

The copolyesters in general may be prepared by condensing the dicarboxylic acid or dicarboxylic acid ester with the glycol in the presence of a catalyst at elevated temperatures increased gradually during the course of the condensation up to a temperature of about 225° C. to 310° C., in an inert atmosphere, and conducting the condensation at low pressure during the latter part of the condensation, as described in further detail in U.S. Pat. No. 2,720,507 incorporated herein by reference herein.

In some embodiments, during the process for making the copolyesters useful in the present disclosure, certain agents which colorize the polymer can be added to the melt including toners or dyes. In one embodiment, a bluing toner is added to the melt in order to reduce the $b^*$ of the resulting copolyester polymer melt phase product. Such bluing agents include blue inorganic and organic toner(s) and/or dyes. In addition, red toner(s) and/or dyes can also be used to adjust the $a^*$ color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the raw materials, e.g., ethylene glycol.

The total amount of toner components added can depend on the amount of inherent yellow color in the base copolyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

In one aspect of the present disclosure, the copolyester compositions further comprise recycled polyethylene terephthalate (rPET) or recycled polyesters. It is desirable that recycled PET (rPET) or recycled polyesters be incorporated into new molded or extruded articles. Use of rPET or recycled polyesters lowers the environmental footprint of a product offering and improves the overall life-cycle analysis. The use of rPET or recycled polyesters offers economic advantages, and it would reduce the overall amount of packaging-related products sent to landfills or that could potentially end up contaminating oceans or other bodies of water.

There is no limitation on the recycled polyethylene terephthalate (rPET) or recycled polyesters that may be used in the to make blends with the copolyester compositions of the present disclosure. In one embodiment the rPET or recycled polyesters are mechanically recycled. In one embodiment the rPET or recycled polyesters are produced from chemically recycled monomers (produced by any known methods of depolymerization).

In one embodiment, the rPET may have minor modifications such as with up to 5 mole % of isophthalic acid and/or up to 5 mole % of CHDM or other diols. In one embodiment, the recycled PET (rPET) can be virtually any "waste" industrial or post-consumer PET. In one embodiment, the rPET useful in the blend compositions of the present disclosure may be post-consumer recycled PET. In one embodiment, the rPET is post-industrial recycled PET. In one embodiment, the rPET is post-consumer PET from soft drink bottles. In one embodiment, scrap PET fibers, scrap PET films, and poor-quality PET polymers are also suitable sources of rPET. In one embodiment, the recycled PET comprises substantially PET, although other copolyesters can also be used, particularly where they have a similar structure as PET, such as PET copolymers or the like. In one embodiment, the rPET is clean. In one embodiment, the rPET is substantially free of contaminants. In one embodiment, the rPET may be in the form of flakes.

In one embodiment, the copolyester compositions comprise 0 to 50 wt % of rPET. In one embodiment, the copolyester compositions comprise 1 to 40 wt % of rPET. In one embodiment, the copolyester compositions comprise 2 to 30 wt % of rPET. In one embodiment, the copolyester compositions comprise 3 to 20 wt % of rPET. In one embodiment, the copolyester compositions comprise 4 to 15 wt % of rPET. In one embodiment, the copolyester compositions comprise 5 to 10 wt % of rPET.

In one embodiment, up to about 50% by weight of rPET can be incorporated into the copolyester compositions of the present disclosure. In one embodiment, the rPET/copolyester blend is 15-50 wt % of rPET. In one embodiment, the rPET/copolyester blend is 25-40 wt % of rPET. In one embodiment, the rPET/copolyester blend is 20-30 wt % of rPET. In one embodiment rPET/copolyester blend is 15-50 wt % of rPET and 50-85 wt % of at least one copolyester.

The copolyester/rPET blends can be prepared by conventional processing techniques known in the art, such as melt blending, melt mixing, compounding via single screw extrusion, compounding via twin-screw extrusion, batch melt mixing equipment or combinations of the aforementioned. In one embodiment, the copolyester/rPET blends are compounded at temperatures of 220-320° C. In one embodiment, the copolyester/rPET blends are compounded at temperatures of 220-300° C. In one embodiment, the copolyester/rPET blends can be pre-dried at 60-160° C. In one embodiment, the copolyester/rPET blends are not pre-dried. In one embodiment, the compounding can occur under vacuum. In one embodiment, the compounding does not occur under vacuum.

In some embodiments, the copolyester compositions can also contain common additives in the amounts required for the intended application. In some embodiments, the copolyester compositions can contain from 0.01 to 25% or from 0.01 to 10% by weight of the overall composition common additives such as colorants, toner(s), dyes, mold release agents, flame retardants, extenders, reinforcing agents or materials, fillers, antistatic agents, antimicrobial agents, antifungal agents, self-cleaning or low surface energy agents, scents or fragrances, antioxidants, extrusion aids, slip agents, release agents, carbon black, and other pigments, plasticizers, glass bubbles, nucleating agents, stabilizers, including but not limited to, UV stabilizers, thermal stabilizers, and/or reaction products thereof, fillers, and impact modifiers, and the like, and mixtures thereof, which are known in the art for their utility in copolyester blends. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the copolyester composition.

Reinforcing materials may be added to the compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one embodiment, the compositions of the present disclosure are useful as plastics, films, fibers, and sheet. The compositions of this disclosure are useful as molded or shaped articles, molded or shaped parts or as solid plastic objects. In one embodiment, the compositions of this disclosure are useful as molded parts or molded articles. In one embodiment, the compositions are suitable for use in any applications where clear, hard plastics are required. In one embodiment, the compositions are suitable for use in any applications where reclosable lids with living hinges are required. Examples of such parts and articles include cups, jars, cosmetics packaging, lids, decorative lids, personal care product packaging, electronics housing, bottles, bottle caps, electronic equipment cases, automotive parts, automotive interior parts, toys, toy parts, medical devices, dental trays, dental appliances, dental floss packaging, containers, food containers, shipping containers, packaging, insulated articles, insulated containers, trays, food trays, food pans, tumblers, storage boxes, bottles, water bottles, vacuum cleaner parts, healthcare supplies, commercial foodservice products, boxes, machine guards, medical packaging, and the like.

This disclosure further relates to articles of manufacture comprising the film(s) and/or sheet(s) containing the copolyester compositions described herein. In some embodiments, the films and/or sheets of the present disclosure can be of any thickness as required for the intended application.

This disclosure further relates to the film(s) and/or sheet(s) described herein. The methods of forming the copolyester compositions into film(s) and/or sheet(s) includes any methods known in the art. Examples of film(s) and/or sheet(s) of the disclosure including but not limited to extruded film(s) and/or sheet(s), calendered film(s) and/or sheet(s), compression molded film(s) and/or sheet(s), Methods of making film and/or sheet include but are not limited to extrusion, calendering, and compression molding.

This disclosure further relates to the molded or shaped articles described herein. The methods of forming the copolyester compositions into molded or shaped articles includes any known methods in the art. Examples of molded or shaped articles of this disclosure including but not limited to thermoformed or thermoformable articles, injection molded articles, extrusion molded articles, injection blow molded articles, injection stretch blow molded articles and extrusion blow molded articles. Methods of making molded articles include but are not limited to thermoforming, injection molding, extrusion, injection blow molding, injection stretch blow molding, and extrusion blow molding. The processes of this disclosure can include any thermoforming processes known in the art. The processes of this disclosure can include any blow molding processes known in the art including, but not limited to, extrusion blow molding, extrusion stretch blow molding, injection blow molding, and injection stretch blow molding.

This disclosure includes any injection molding manufacturing process known in the art. Although not limited thereto, a typical description of injection molding manufacturing process involves: 1) melting the composition; 2) injecting the molten composition into an injection mold to form the desired shape of the final article; 3) cooling the molded article; and 4) ejecting the article from the mold.

This disclosure includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; and 6) ejecting the article from the mold.

This disclosure includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; and 6) ejecting the article from the mold.

This disclosure includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

In one embodiment, the molded articles and parts of the present disclosure can be of any thickness required for the intended end use application. In one embodiment, the thickness of the molded articles and parts of the present disclosure are less than about 3 mm. In one embodiment, the thickness of the molded articles and parts is from about 0.1-2 mm. In one embodiment, the thickness of the molded articles and parts is from about 0.5-2 mm. In one embodiment, the thickness of the molded articles and parts is from about 0.1-1 mm. In one embodiment the lid component has a thickness of from about 0.5-2 mm or from 0.75 to 1.5 mm. In one embodiment, the container component has a thickness of from about 0.1 to 1 mm.

One aspect of the present disclosure relates to shrink film labels that can be recycled in a PET recycle stream. In one embodiment of the present disclosure, certain combinations of glycol monomers in a shrink film resin composition can produce a film with good shrink film performance and also be crystallizable such that it does not impact the recycling of the accompanying PET flake during recycling. These crystallizable shrink film resins can be processed with the PET bottle and end up as a component in the recyclable PET flake leaving the recycling process. It has also been found that the choice and quantity of specific combinations of glycol monomers are important to produce films with good shrink film properties and to produce a film that is crystallizable. The optimized polyester resin compositions of this disclosure are amorphous but crystallizable. As such, they exhibit good properties in film application including as shrink films, but they have high strain induced crystalline melting points, so they provide compatibility in recycling processes. The shrink film labels of the present disclosure do not have to be removed during the recycle process, and they do not impact the process.

The heat-shrinkable films must meet a variety of fitness for use criteria to perform in this disclosure. The films must be tough, must shrink in a controlled manner, and must provide enough shrink force to hold itself on the bottle without crushing the contents. In addition, when these labels are applied to polyester containers or bottles, these polyester shrink film labels must not interfere with the recycling process of the polyester containers or bottles. The shrink films of the present disclosure are advantageous because the label can be recycled with the bottles or containers. As such, the entire container or bottle, including the label, can be recycled and converted into new products without creating additional handling requirements or creating new environmental issues. The heat-shrinkable films have been made from a variety of raw materials to meet a range of material demands. This disclosure describes unique and unexpected effects measured with certain monomer combinations for shrink film resin compositions.

Polyester shrink film compositions have been used commercially as shrink film labels for food, beverage, personal care, household goods, etc. Often, these shrink films are used in combination with a clear polyethylene terephthalate (PET) bottle or container. The total package (bottle plus label) is then placed in the recycling process. In a typical recycling center, the PET and the shrink film material can end up together at the end of the process due to similarities in composition and density. Drying of the PET flake is required to remove residual water that remains with the PET through the recycling process. Typically, PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step.

The film or sheet resin compositions in the present disclosure with a certain combinations of glycol monomers can produce film or sheet with good performance properties and these compositions are also crystallizable such that they do not impact the recycling of the PET flake. These crystallizable film or sheet resins can be processed with recycled PET and end up as a component in the recyclable PET flake leaving the recycling process. It has also been found that the choice and quantity of specific combinations of glycol monomers are important to produce film or sheet with good performance properties and to produce a film or sheet that is crystallizable. In other words, the polyester compositions of the present disclosure are amorphous, but they are "crystallizable" in the sense that they have high strain induced crystalline melting points. As such, they exhibit good properties in film or sheet applications including shrink films, molded, thermoformed, or shaped parts and/or articles, but they also possess high strain induced crystalline melting points, so they can be recycled with PET, because when the recycled PET flakes are subjected to high temperature drying conditions, the crystallizable polyesters of the disclosure do not form clumps, which deter the normal mechanical operation of flaking, drying, and feeding of the flake into an extruder for further processing into (recycled) polyester pellets. Similarly, the sheet of the present disclosure does not have to be removed during the recycle process, and thus does not adversely impact the recycle process. (See, for example, https://www.thebalancesmb.com/recycling-poly-ethylene-terephthalate-pet-2877869.)

One embodiment of the present disclosure is a crystallizable film comprising an amorphous polyester composition comprising: at least one polyester which comprises: (a) a dicarboxylic acid component comprising: (i) about 70 to about 100 mole % of terephthalic acid residues; (ii) about 0 to about mole % of aromatic and/or aliphatic dicarboxylic acid residues having up to carbon atoms; and (b) a diol component comprising: about 75 mole % or greater of ethylene glycol residues and about 25 mole % or less of other glycols comprising one or more of: (i) about 0.1 to less than about 24 mole % of neopentyl glycol residues; (ii) 0 to less than about 24 mole % of 1,4-cyclohexanedimethanol residues; (iii) about 1 to less than about 10 mole % of total diethylene glycol residues in the final polyester composition; wherein the total mole % of the dicarboxylic acid component is 100 mole %, and wherein the total mole % of the diol component is 100 mole %.

One embodiment of the present disclosure is a crystallizable film comprising an amorphous polyester composition comprising: at least one polyester which comprises: (a) a dicarboxylic acid component comprising: (i) about 70 to about 100 mole % of terephthalic acid residues; (ii) about 0 to about mole % of aromatic and/or aliphatic dicarboxylic acid residues having up to carbon atoms; and (b) a diol component comprising: about 80 mole % or greater of ethylene glycol residues and about 20 mole % or less of other glycols comprising: (i) about 5 to less than about 17 mole % of neopentyl glycol residues; (ii) about 2 to less than about 10 mole % of 1,4-cyclohexanedimethanol residues; (iii) about 1 to less than about 5 mole % of total diethylene glycol residues in the final polyester composition; wherein the total mole % of the dicarboxylic acid component is 100 mole %, and wherein the total mole % of the diol component is 100 mole %.

One embodiment of the present disclosure is a crystallizable film comprising an amorphous polyester composition comprising: at least one polyester which comprises: (a) a dicarboxylic acid component comprising: (i) about 70 to about 100 mole % of terephthalic acid residues; (ii) about 0 to about mole % of aromatic and/or aliphatic dicarboxylic acid residues having up to carbon atoms; and (b) a diol component comprising: about 76 mole % or greater of ethylene glycol residues and about 24 mole % or less of amorphous content chosen from: (i) neopentyl glycol residues; (ii) cyclohexanedimethanol residues; and (iii) diethylene glycol residues in the final polyester composition; wherein the total mole % of the dicarboxylic acid component is 100 mole %, and wherein the total mole % of the diol component is 100 mole %.

One embodiment of the present disclosure is a crystallizable film comprising a polyester composition comprising: at least one polyester which comprises: (a) a dicarboxylic acid component comprising: (i) about 70 to about 100 mole % of terephthalic acid residues; (ii) about 0 to about 30 mole % of aromatic and/or aliphatic dicarboxylic acid residues having up to 20 carbon atoms; and (b) a diol component comprising: (i) about 1 to about 30 mole % neopentyl glycol residues; (ii) about 1 to about less than 30 mole % of 1,4-cyclohexanedimethanol residues; (iii) about 1.5 to 6 mole % of residues of diethylene glycol; and wherein the remainder of the glycol component comprises: (iv) residues of ethylene glycol, and (v) 0 to 20 mole % of the residues of at least one modifying glycol; wherein the total mole % of the dicarboxylic acid component is 100 mole %, and wherein the total mole % of the glycol component is 100 mole %.

One embodiment of the present disclosure is a crystallizable film of any of the preceding embodiments, wherein the film is stretched in at least one direction and the stretched film has a strain induced crystalline melting point of 190° C. or greater. One embodiment of the present disclosure is a crystallizable film of any of the preceding embodiments, wherein the film is stretched in at least one direction and the stretched film has a strain induced crystalline melting point of about 190° C. to about 215° C.

One embodiment of the present disclosure is an extruded or calendared film comprising a crystallizable film of any of the preceding embodiments.

One embodiment of the present disclosure is a crystallizable film comprising a blend of polyester compositions comprising: (1) at least one crystallizable polyester which comprises: residues of terephthalic acid, neopentyl glycol (NPG), 1,4-cyclohexanedimethanol (CHDM), ethylene glycol (EG), and diethylene glycol (DEG), in certain compositional ranges and (2) at least one amorphous polyester which comprises: residues of terephthalic acid, neopentyl glycol (NPG), 1,4-cyclohexanedimethanol (CHDM), ethylene glycol (EG), and diethylene glycol (DEG), in certain compositional ranges.

One embodiment of the present disclosure relates to crystallizable polyester blend compositions. In one embodiment, the crystallizable polyester blend composition comprises: (a) from 5 to 95 weight % of the crystallizable polyester compositions and (b) from 5 to 95 weight % of at least one amorphous polyester compositions.

One embodiment of the present disclosure is crystallizable composition comprising a blend of polyester compositions comprising:

(1) 5-80% of at least one crystallizable polyester which comprises:
    (a) a dicarboxylic acid component comprising:
        (i) about 70 to about 100 mole % of terephthalic acid residues;
        (ii) about 0 to about 30 mole % of aromatic and/or aliphatic dicarboxylic acid residues having up to 20 carbon atoms; and
    a diol component chosen from either (b) or (b'), wherein
        (b) is a diol component comprising:
about 75 mole % or greater of ethylene glycol residues and about 25 mole % or less of other glycols comprising one or more of:
    (i) about 0 to less than about 25 mole % of neopentyl glycol residues;
    (ii) about 0 to less than about 25 mole % of 1,4-cyclohexanedimethanol residues;
    (iii) about 0 to less than about 10 mole % of total diethylene glycol residues in the final polyester composition;
wherein the total mole % of the dicarboxylic acid component is 100 mole %, and wherein the total mole % of the diol component is 100 mole %; and
wherein (b') is a diol component comprising:
    about 75 mole % or greater of ethylene glycol residues and about 25 mole % or less of other glycols comprising one or more of:
        (i) about 0.1 to less than about 24 mole % of neopentyl glycol residues;
        (ii) about 0.1 to less than about 24 mole % of 1,4-cyclohexanedimethanol residues;
        (iii) about 1 to less than about 10 mole % of total diethylene glycol residues in the final polyester composition;
wherein the total mole % of the dicarboxylic acid component is 100 mole %, and wherein the total mole % of the diol component is 100 mole %.
    and
(2) 20-95% of at least one amorphous polyester which comprises:
    (a) a dicarboxylic acid component comprising:
        (i) about 70 to about 100 mole % of terephthalic acid residues;
        (ii) about 0 to about 30 mole % of aromatic and/or aliphatic dicarboxylic acid residues having up to 20 carbon atoms; and
    (b) a diol component comprising:
about 60 mole % or greater of ethylene glycol residues and about 40 mole % or less of other glycols comprising one or more of:
    (i) about 0 to less than about 40 mole % of neopentyl glycol residues;
    (ii) about 0 to less than about 40 mole % of 1,4-cyclohexanedimethanol residues;
    (iii) about 0 to less than about 15 mole % of total diethylene glycol residues in the final polyester composition;
wherein the total mole % of the dicarboxylic acid component is 100 mole %, and
wherein the total mole % of the diol component is 100 mole %; and wherein (1) and (2) are different.

One embodiment of the present disclosure is a crystallizable composition comprising a blend of polyester compositions comprising:

(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 80 mole % or greater of ethylene glycol residues and about 20 mole % or less of other glycols comprising one or more of:
  (i) about 0 to less than about 20 mole % of neopentyl glycol residues;
  (ii) about 0 to less than about 20 mole % of 1,4-cyclohexanedimethanol residues;
  (iii) about 0 to less than about 10 mole % of total diethylene glycol residues in the final polyester composition;
wherein the total mole % of the dicarboxylic acid component is 100 mole %,
and wherein the total mole % of the diol component is 100 mole %; and
(2) 20-95% of at least one amorphous polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 70 mole % or greater of ethylene glycol residues and about 30 mole % or less of other glycols comprising one or more of:
  (i) about 0 to less than about 30 mole % of neopentyl glycol residues;
  (ii) about 0 to less than about 30 mole % of 1,4-cyclohexanedimethanol residues;
  (iii) about 0 to less than about 15 mole % of total diethylene glycol residues in the final polyester composition;
wherein the total mole % of the dicarboxylic acid component is 100 mole %, and wherein the total mole % of the diol component is 100 mole %; and
wherein (1) and (2) are different.

One embodiment of the present disclosure is a crystallizable composition comprising a blend of polyester compositions comprising:
(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 85 mole % or greater of ethylene glycol residues and about 15 mole % or less of other glycols comprising one or more of:
  (i) about 0 to less than about 15 mole % of neopentyl glycol residues;
  (ii) about 0 to less than about 15 mole % of 1,4-cyclohexanedimethanol residues;

(iii) about 0 to less than about 5 mole % of total diethylene glycol residues in the final polyester composition;
wherein the total mole % of the dicarboxylic acid component is 100 mole %, and wherein the total mole % of the diol component is 100 mole %; and
(2) 20-95% of at least one amorphous polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
about 60 mole % or greater of ethylene glycol residues and
about 40 mole % or less of other glycols comprising one or more of:
  (i) neopentyl glycol residues;
  (ii) 1,4-cyclohexanedimethanol residues; and
  (iii) diethylene glycol residues in the final polyester composition, whether or not formed in situ;
wherein the total mole % of the dicarboxylic acid component is 100 mole %, and wherein the total mole % of the diol component is 100 mole %; and wherein (1) and (2) are different.

One embodiment of the present disclosure is a crystallizable composition comprising a blend of polyester compositions comprising:
(1) 5-80% of at least one crystallizable polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0 to about 30 mole % of neopentyl glycol residues;
    (ii) about 0 to about less than 30 mole % of 1,4-cyclohexanedimethanol residues;
    (iii) residues of diethylene glycol; and wherein the remainder of the glycol component comprises:
    (iv) residues of ethylene glycol, and
    (v) optionally, 0.1 to 20 mole %, of the residues of at least one modifying glycol;
wherein the total mole % of the dicarboxylic acid component is 100 mole %,
and wherein the total mole % of the glycol component is 100 mole %; and
(2) 20-95% of at least one amorphous polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0 to about 40 mole % of neopentyl glycol residues;
    (ii) about 0 to about less than 40 mole % of 1,4-cyclohexanedimethanol residues;
    (iii) residues of diethylene glycol, whether or not formed in situ; and wherein the remainder of the glycol component comprises:

(iv) residues of ethylene glycol, and (v) 0 to 20 mole %, or 0 to 10 mole %, or 0 to 5 mole % of the residues of at least one modifying glycol;

wherein the total mole % of the dicarboxylic acid component is 100 mole %, and wherein the total mole % of the glycol component is 100 mole %; wherein (1) and (2) are different.

In other embodiments of the disclosure, the blend compositions have a crystalline melting point in the range of about 200 to about 255° C.

In other embodiments of the disclosure, the above blends have a crystalline melting point in a range of about 220° to about 230° C. or in the range of about 245° to about 255° C. In other embodiments, component (1) has a crystalline melting point of about 220° to about 230° C.

One embodiment of the present disclosure is a crystallizable film of the preceding embodiments, wherein the film is stretched in at least one direction and the stretched film has a strain induced crystalline melting point of 200° C. or greater.

One embodiment of the present disclosure is a polyester recycle stream comprising recycled poly(ethylene terephthalate) flake, having admixed therewith at least about 0.1 weight percent of crystallizable recycled shrink film or thermoformed sheet of the present disclosure.

The crystallizable compositions of the present disclosure thus present an advantageous component of a PET recycle stream insofar as such compositions can accompany PET in recycle streams without additional separation steps. Accordingly, in one embodiment of the present disclosure there is provided a polyester recycle stream, comprising recycled poly(ethylene terephthalate) flake, having admixed therewith at least about 0.1 weight percent of the crystallizable compositions of the present disclosure. In another embodiment, wherein said stream passes the "Critical Guidance Protocol for Clear PET Articles with Labels and Closures", dated Apr. 11, 2019, Document No. PET-CG-02.

Heat-shrinkable plastic films are used as coverings, to hold objects together, and as an outer wrapping for bottles, cans and other kinds of containers. For example, such films are used for covering the cap, neck, shoulder or bulge of bottles or the entire bottle; for the purpose of labeling, protection, parceling, or increasing the value of the product; and for other reasons. In addition, such films may be used as a covering to package such objects as boxes, bottles, boards, rods, or notebooks together in groups, and such films may also be affixed closely as a wrapping. The uses mentioned above take advantage of the shrinkability and the internal shrink stress of the film.

Heat-shrinkable films must meet a variety of fitness for use criteria in order to perform in this application. The films must be tough, must shrink in a controlled manner, and must provide enough shrink force to hold itself on the bottle without crushing the contents. In addition, when these labels are applied to polyester containers, they must not interfere with the recycling process for the PET bottle. In fact, it would be advantageous, if the label was also recyclable so the entire bottle can be recycled and converted into new products without creating additional handling requirements or create new environmental issues. Heat-shrinkable films have been made from a variety of raw materials to meet a range of material demands. This disclosure describes unique and unexpected effects measured with certain monomers combinations that improves the recyclability of the polyester shrink film label.

Polyester shrink film compositions are used commercially as shrink film labels for food, beverage, personal care, household goods, etc. Often, these shrink films are used in combination with clear polyethylene terephthalate (PET) bottles or containers. The total package (bottle plus label) is then placed in the recycling process. In a typical recycling center, the PET and the shrink film material often end up together at the end of the process due to similarities in composition and density. Drying of the PET flake is required to remove residual water that remains with the PET through the recycling process. Typically, during a recycling process, the PET is dried at temperatures above 200° C. At those temperatures, typical polyester shrink film resins will soften and become sticky, often creating clumps with PET flakes. These clumps must be removed before further processing. These clumps reduce the yield of PET flake from the process and create an additional handling step.

In the present disclosure certain combinations of glycol monomers in a shrink film resin composition can produce a shrink film with good performance properties that is also crystallizable such that it does not impact the recycling of the PET flake during the recycling process. These crystallizable shrink film resins can be processed with the PET bottle and end up as a component in the recyclable PET flake leaving the recycling process. It has also been found that the choice and quantity of the specific combinations of glycol monomers are important to produce films with good shrink film properties and films that are crystallizable.

The diol component of the polyester compositions useful as shrink film resins in the present disclosure can include, but is not limited to, compositions wherein the sum of the residues of 1,4-cyclohexanedimethanol and residues of neopentyl glycol in the final polyester composition is from 1 to mole %, or from 1 to 25 mole %, 1 to 20 mole %, or from 1 to 15 mole %, or from 1 to 10 mole %, or from 2 to 30 mole %, or from 2 to 25 mole %, or from 2 to 20 mole %, or from 2 to 15 mole %, or from 2 to 10 mole %, or from 3 to 30 mole %, or from 3 to 25 mole %, or from 3 to 20 mole %, or from 3 to 15 mole %, or from 3 to 10 mole %, 4 to 30 mole %, or from 4 to 25 mole %, 4 to 20 mole %, or from 4 to 15 mole %, or from 4 to 10 mole %, 5 to 30 mole %, or from 5 to 25 mole %, 5 to 20 mole %, or from 5 to 15 mole %, or from 5 to 10 mole %, 6 to 30 mole %, or from 6 to 25 mole %, 6 to 20 mole %, or from 6 to 15 mole %, or from 6 to 10 mole %, 7 to 30 mole %, or from 7 to 25 mole %, 7 to 20 mole %, or from 7 to 15 mole %, or from 7 to 10 mole %, 8 to 30 mole %, or from 8 to 25 mole %, 8 to 20 mole %, or from 8 to 15 mole %, or from 8 to 10 mole %, 9 to 30 mole %, or from 9 to 25 mole %, 9 to 20 mole %, or from 9 to 15 mole %, or from 9 to 10 mole %, 10 to 30 mole %, or from 10 to 25 mole %, 10 to 20 mole %, or from 10 to mole %, or from 11 to 30 mole %, 11 to 30 mole %, or from 11 to 25 mole %, 11 to 20 mole %, or from 11 to 15 mole %, or from 12 to 30 mole %, 12 to 25 mole %, or from 12 to 20 mole %, 12 to 15 mole %, or from 13 to 30 mole %, or from 13 to 25 mole %, 13 to 20 mole %, or from 13 to 15 mole %, 14 to 30 mole %, or from 14 to 25 mole %, or from 14 to 20 mole %, 14 to 15 mole %, or from 15 to 30 mole %, 15 to 25 mole %, or from 15 to 20 mole %, or from 16 to 20 mole %, 18 to 20 mole %, or from 10 to 18 mole %, 16 to 18 mole %, or from 12 to 16 mole %, or from 16 to 20 mole %, or from 14 to 18 mole %, or from 11 to 30 mole %, or from 13 to 30 mole %, or from 14 to 30 mole %, or from 10 to 29 mole %, or from 11 to 29 mole %, or from 12 to 29 mole %, or from 13 to 29 mole %, or from 14 to 29 mole %, or from 15 to 29 mole %, or from 10 to 28 mole %, or from 11 to 28 mole %, or from 12 to 28 mole %, or from 13 to 28 mole %, or from 14 to 28 mole %, or from 15 to 28 mole %. In one embodiment, the sum of residues of 1,4-cyclohexanedimethanol and residues of neopentyl glycol in the final polyester composition can be from 1 to 16 mole %, 2 to 14 mole %, 4 to 15 mole %, or from 2 to 21 mole %, or from 2 to less than 20 mole %, or from 4 to 20 mole %, or from 5 to 18 mole %, or from 10 to 21 mole %, or from 12 to 21 mole %, wherein the total mole % of the diol component is 100 mole %.

In one embodiment, the diol component of the polyester compositions useful as shrink film resins in this disclosure can contain 1 to 30 mole % of neopentyl glycol based on the total mole % of the diol component being 100 mole %. In one embodiment, the diol component of the polyester compositions useful in this disclosure can contain 1 to 25 mole % of neopentyl glycol based on the total mole % of the diol component being 100 mole %. In one embodiment, the diol component of the polyester compositions useful in this disclosure can contain 1 to 17 mole % of neopentyl glycol based on the total mole % of the diol component being 100 mole %. In one embodiment, the diol component of the polyester compositions useful in this disclosure can contain to 20 mole % of neopentyl glycol based on the total mole % of the diol component being 100 mole %. In one embodiment, the diol component of the polyester compositions useful in this disclosure can contain 10 to 20 mole % of neopentyl glycol based on the total mole % of the diol component being 100 mole %. In one embodiment, the diol component of the polyester compositions useful in this disclosure can contain 10 to 15 mole % of neopentyl glycol based on the total mole % of the diol component being 100 mole %. In one embodiment, the diol component of the polyester compositions useful in this disclosure can contain 15 to 25 mole % of neopentyl glycol residues based on the total mole % of the diol component being 100 mole %.

In one embodiment, the diol component of the polyester compositions useful as shrink film resins in the present disclosure can contain from 0.01 to 30 mole %, or from 0.1 to 20 mole %, or from 2 to 20 mole %, or from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, or from 2 to 10 mole %, or from 2 to 9 mole %, or from 2 to 8 mole %, or from 2 to 7 mole %, or from 2 to 5 mole %, or from 1 to 7 mole %, or from 1 to 5 mole %, or from 1 to 3 mole %, of 1,4-cyclohexanedimethanol residues, based on the total mole % of the diol component being 100 mole %.

In one embodiment, the diol component of the polyester compositions useful as shrink film resins in the present disclosure can contain 0.01 to 15 mole % of 1,4-cyclohexanedimethanol residues based on the total mole % of the diol component being 100 mole %. In one embodiment, the diol component of the polyester compositions useful in this disclosure can contain 0 to less than 15 mole % of 1,4-cyclohexanedimethanol residues based on the total mole % of the diol component being 100 mole %. In one embodiment, the diol component of the polyester compositions useful in this disclosure can contain 0.01 to 10 mole % of 1,4-cyclohexanedimethanol residues based on the total mole % of the diol component being 100 mole %. In one embodiment, the diol component of the polyester compositions useful in this disclosure can contain 0 to less than 10 mole % of 1,4-cyclohexanedimethanol residues based on the total mole % of the diol component being 100 mole %. In one embodiment, the diol component of the polyester compositions useful in this disclosure can contain 0.01 to 5 mole % of 1,4-cyclohexanedimethanol residues based on the total mole % of the diol component being 100 mole %. In one embodiment, the diol component of the polyester compositions useful in this disclosure can contain 0 to less than 5 mole % of 1,4-cyclohexanedimethanol residues based on the total mole % of the diol component being 100 mole %.

It should be understood that some other diol residues may be formed in situ during processing. In one embodiment, the diol component of the polyester compositions useful as shrink film resins as recited in this disclosure can contain diethylene glycol residues formed in situ during processing or intentionally added, or both, in any amount. For example, in one embodiment, the polyester compositions useful in this disclosure can contain diethylene glycol residues from 1 to 15 mole %, or from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from 5 to 12 mole %, or from 5 to 11 mole %, or 5 to 10 mole %, or from 5 to 9 mole %, based on the total mole % of the diol component being 100 mole %.

In one embodiment, the total amount of diethylene glycol residues present in the polyester compositions useful as shrink film resins in the present disclosure, whether or not formed in situ during processing or intentionally added or both, can be from 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 1 to 4 mole %, or from 1 to 3 mole %, or from 1 to 2 mole % of diethylene glycol residues, or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to mole %, or in some embodiments there is no intentionally added diethylene glycol residues, based on the total mole % of the diol component being 100 mole %.

For all embodiments of the polyester compositions useful as shrink film resins in the present disclosure, the remainder of the diol component can comprise ethylene glycol residues in any amount based on the total mole % of the diol component being 100 mole %. In one embodiment, the polyester portion of the polyester compositions useful in the present disclosure can 10 contain 50 mole % or greater, or 55 mole % or greater, or 60 mole % or greater, or 65 mole % or greater, or 70 mole % or greater, or 75 mole % or greater, or 80 mole % or greater, or 85 mole % or greater, or 90 mole % or greater, or 95 mole % or greater, or from 50 to 85 mole %, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole %, or from 70 to 80 mole %, or from 75 to 85 mole % of ethylene glycol residues, based on the total mole % of the diol component being 100 mole %.

In one embodiment, the diol component of the polyester compositions useful as shrink film resins in the present disclosure can contain up to 20 mole %, or up to 19 mole %, or up to 18 mole %, or up to 17 mole %, or up to 16 mole %, or up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4 mole %, or up to 3 mole %, or up to 2 mole %, or up to 1 mole %, or less of one or more modifying diols (modifying diols are defined as diols which are not ethylene glycol, diethylene glycol, neopentyl glycol, or 1,4-cyclohexanedimethanol). In certain embodiments, the polyester compositions useful in this disclosure can contain 10 mole % or less of one or more modifying diols. In certain embodiments, the polyesters useful in this disclosure can contain 5 mole % or less of one or more modifying diols. In certain embodiments, the polyesters useful in this disclosure can contain 3 mole % or less of one or more modifying diols. In another embodiment, the polyesters useful in this disclosure can contain 0 mole % modifying diols. It is contemplated, however, that some other diol residues may form in situ so that residual amounts formed in situ are also an embodiment of this disclosure.

In embodiments, modifying diols for use in the polyesters compositions useful as shrink film resins, if used, as defined herein contain 2 to 16 carbon atoms. Examples of modifying diols include, but are not limited to, 1,2-propanediol, 1,3-propanediol, isosorbide, 1,4-butanediol, 1,5-pentanediol, 1,6-hexanediol, p-xylene glycol, polytetramethylene glycol, 2,2,4,4-tetramethyl-1,3-cyclobutanediol (TMCD) and mixtures thereof. In one embodiment, isosorbide is a modifying diol. In another embodiment, the modifying diols include, but are not limited to, at least one of 1,3-propanediol and 1,4-butanediol. In one embodiment, 1,3-propanediol and/or 1,4-butanediol can be excluded. If 1,4- or 1,3-butanediol are used, greater than 4 mole % or greater than 5 mole % can be provided in one embodiment. In one embodiment, at least one modifying diol is 1,4-butanediol which present in the amount of 5 to 25 mole %. In certain embodiments, the polyester compositions contain no added modifying diols.

In one embodiment, a shrink film is provided comprising a polyester composition further comprising: 1,4-cyclohexanedimethanol residues are present in the amount of 0.01 to about 10 mole %, diethylene glycol residues are present in the amount of 2 to 9 mole %, neopentyl glycol residues in the amount of 5 to 30 mole %, and ethylene glycol residues are present in the amount of 60 mole % or greater, based on the total mole % of the diol component being 100 mole %.

In one embodiment, the polyester compositions useful as shrink film resins in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion.

In certain embodiments, the amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that polyester compositions useful as shrink film resins in the present disclosure can possess at least one of the inherent viscosity ranges described herein and at least one of the monomer ranges for the polyester compositions described herein, unless otherwise stated. It is also contemplated that polyester compositions useful in the present disclosure can possess at least one of the Tg ranges described herein and at least one of the monomer ranges for the polyester compositions described herein, unless otherwise stated. It is also contemplated that polyester compositions useful in the present disclosure can possess at least one of the inherent viscosity ranges described herein, at least one of the Tg ranges described herein, and at least one of the monomer ranges for the polyester compositions described herein, unless otherwise stated.

For embodiments of this disclosure, the polyester compositions useful as shrink film resins in this disclosure can exhibit at least one of the following inherent viscosities as determined in 60/40 (wt/wt) phenol/tetrachloroethane at a concentration of 0.5 g/dL at 25° C.: 0.50 to 1.2 dL/g; 0.50 to 1.0 dL/g; 0.50 to 0.90 dL/g; 0.50 to 0.80 dL/g; 0.55 to 0.80 dL/g; 0.60 to 0.80 dL/g; 0.65 to 0.80 dL/g; 0.70 to 0.80 dL/g; 0.50 to 0.75 dL/g; 0.55 to 0.75 dL/g; or 0.60 to 0.75 dL/g.

The glass transition temperature and the strain induced crystalline melting point (Tg and $T_m$ respectively) of the polyester compositions useful as shrink film resins in the present disclosure is determined using a TA DSC 2920 from Thermal Analyst Instrument at a scan rate of 20° C./min. $T_m$ was measured on the first heat of stretched samples and Tg was measured during the 2nd heating step. Additionally, samples could be crystallized in a forced air oven at 170° C. for 2 h and then analyzed with DSC. For all samples, a crystalline melting point is typically NOT present during the second heat of the DSC scan with a heating rate of 20° C./min.

In certain embodiments, the oriented films, shrink films, or thermoformed sheets of this disclosure comprise polyesters/polyester compositions wherein the polyester has a Tg of 60 to 80° C.; 70 to 80° C.; 65 to 80° C.; 72 to 77° C., or 65 to 75° C. In certain embodiments, the inherent viscosity of the polyester is from 0.68 to 0.75 dL/g as determined in 60/40 (wt/wt) phenol/tetrachloroethane at a concentration of 0.5 g/dL at 25° C., and the polyester has a Tg of from 72° C. to 77° C. as determined using a TA DSC 2920 from Thermal Analyst Instrument at a scan rate of 20° C./min.

In certain embodiments, these Tg ranges can be met with or without at least one plasticizer being added during polymerization or during extrusion or during compounding.

In embodiments of the present disclosure, certain oriented films and/or shrinkable films comprising the polyesters and/or polyester compositions useful in this disclosure can have a unique combination of all of the following properties: good stretchability, controlled shrinkage properties, certain toughness, certain inherent viscosities, certain glass transition temperatures (Tg), certain strain induced crystalline melting points, certain flexural modulus, certain densities, certain tensile modulus, certain surface tension, good melt viscosity, good clarity, and good color. In certain embodiments, the oriented films and/or shrinkable films may be used as roll-fed or traditional shrink-sleeve labels, can be printed easily, and seamed by traditional means. The oriented films and/or shrinkable films of the present disclosure can be prepared using any procedures known to persons skilled in the art.

In one embodiment, certain polyester compositions useful as shrink film resins in this disclosure can be visually clear. The term "visually clear" is defined herein as an appreciable absence of cloudiness, haziness, and/or muddiness, when inspected visually.

The polyester portion of the polyester compositions useful as shrink film resins in this disclosure can be made by processes known from the literature, for example, by processes in homogenous solution, by transesterification processes in the melt, and by two phase interfacial processes. Suitable methods include, but are not limited to, the steps of reacting one or more dicarboxylic acids with one or more diols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

In certain embodiments, the polyesters may be prepared by condensing the dicarboxylic acid or dicarboxylic acid ester with the diol in the presence of a catalyst at temperatures that are increased gradually during the course of the condensation in an inert atmosphere, and conducting the condensation at low pressure during the latter part of the condensation, as described in further detail in U.S. Pat. No. 2,720,507 incorporated herein by reference herein.

In some embodiments, during the process for making the polyesters useful in the present disclosure, certain agents which colorize the polymer can be added to the melt including toners or dyes. In one embodiment, a bluing toner is added to the melt in order to reduce the b* of the resulting polyester polymer melt phase product. Such bluing agents include blue inorganic and organic toner(s) and/or dyes. In addition, red toner(s) and/or dyes can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

In embodiments, the polyester compositions can also contain from 0.01 to 25% by weight of the overall composition common additives such as, slip agents, anti-block agents, mold release agents, flame retardants, plasticizers, glass bubbles, nucleating agents, stabilizers, including but not limited to, UV stabilizers, thermal stabilizers, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In one embodiment, the films and the shrink films according to the present disclosure may contain from 0.01 to 10 weight percent of a polyester plasticizer such as those described in U.S. Pat. No. 10,329,393, incorporated herein by reference. In one embodiment, the shrink films can contain from 0.01 to 10 weight percent of the polyester plasticizer compounded in the copolyester of the invention.

In one aspect, the present disclosure relates to shrink film(s), extruded sheet, thermoformed articles, and molded article(s) comprising the polyester compositions of this disclosure. The methods of forming the polyesters compositions into film(s) and/or sheet(s) are well known in the art. Examples of sheet(s) useful the present disclosure include but not are limited to extruded sheet(s), compression molded film(s), calendered film(s) and/or sheet(s), solution casted film(s) and/or sheet(s). In one aspect, methods of making film and/or sheet useful to produce the shrink films of the present disclosure include but are not limited to extrusion, compression molding, calendering, and solution casting.

In one embodiment, the polyester compositions useful as shrink film resins in this disclosure are made into film using any method known in the art to produce films from polyesters, for example, solution casting, extrusion, compression molding, or calendering. (See, for example, U.S. Pat. Nos. 6,846,440; 6,551,699; 6,551,688; and 6,068,910, incorporated herein by reference.

In one embodiment, the as-formed film is then oriented in one or more directions (e.g., monoaxially and/or biaxially oriented film). This orientation of the film can be performed by any method known in the art using standard orientation conditions. For example, the oriented films of the disclosure can be made from films having a thickness of about 100 to 400 microns, for example, extruded, cast or calendered films, which can be oriented at a ratio of 5:1 to 3:1 at a temperature of from Tg to Tg+55° C. or from 70° C. to 125° C., for example, at a ratio of 5:1 or of 3:1 at a temperature from 70° C. to 100° C., and which can be oriented to a thickness of 20 to 80 microns. In one embodiment, the orientation of the initial pre-shrunk film can be performed on a tenter frame according to these orientation conditions.

The shrink films of the present disclosure can have an onset of shrinkage temperature of from about 55° to about 80° C., or about 55° to about 75° C., or about 55° to about 70° C. Onset of shrinkage temperature is the temperature at which the beginning of shrinking occurs.

In certain embodiments, the polyester compositions useful in the present disclosure can have densities of 1.6 g/cc or less, or 1.5 g/cc or less, or 1.4 g/cc or less, or 1.1 g/cc to 1.5 g/cc, or 1.2 g/cc to 1.4 g/cc, or 1.2 g/cc to 1.35 g/cc.

In one embodiment, the density of the films is reduced by introducing many small voids or holes into the film or shaped article. This process is called "voiding" and may also be referred to as "cavitating" or "microvoiding". Voids are obtained by incorporating about 1 to about 50 weight % of small organic or inorganic particles (including glass microspheres) or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/0036545; 2003/0068453; 2003/0165671; 2003/0170427; Japan Patent Application No.'s 61-037827; 63-193822; 2004-181863; European Patent No. 0 581 970 B1, and European Patent Application No. 0 214 859 A2.

In certain embodiments, the as-extruded films are oriented while they are stretched. The oriented films or shrinkable films of the present disclosure can be made from films having any thickness depending on the desired end-use. The desirable conditions are, in one embodiment, where the oriented films and/or shrinkable films can be printed with ink for applications including labels, photo films which can be adhered to substrates such as paper, and/or other applications that it may be useful in or shrunk to encompass the outside of a bottle or container. It may be desirable to coextrude the polyesters useful in the present disclosure with another polymer, such as PET, to make the films useful in making the oriented films and/or shrink films of this disclosure. One advantage of doing the latter is that a tie layer may not be needed in some embodiments.

In one embodiment, the monoaxially and biaxially oriented films of the present disclosure can be made from films having a thickness of about 100 to 400 microns, for example, extruded, cast or calendered films, which can be stretched at a ratio of 6.5:1 to 3:1 at a temperature of from the Tg of the film to the Tg+55° C., and which can be stretched to a thickness of 20 to 80 microns. In one embodiment, the orientation of the initial as-extruded film can be performed on a tenter frame according to these orientation conditions. The shrink films of the present disclosure can be made from the oriented films of this disclosure.

In certain embodiments, the shrink films of the present disclosure have gradual shrinkage with little to no wrinkling. In certain embodiments, the shrink films of the present disclosure have no more than 40% shrinkage in the transverse direction per 5° C. temperature increase increment.

In certain embodiments of the present disclosure, the shrink films of this disclosure have shrinkage in the machine direction of from 10% or less, or 5% or less, or 3% or less, or 2% or less, or no shrinkage when immersed in water at 65° C. for 10 seconds. In certain embodiments of the present disclosure, the shrink films of this disclosure have shrinkage in the machine direction of from −10% to 10%, −5% to 5%, or −5% to 3%, or −5% to 2%, or −4% to 4%, or −3% to 4% or −2% to 4%, or −2% to 2.5%, or −2% to 2%, or 0 to 2%, or no shrinkage, when immersed in water at 65° C. for 10 seconds. Negative machine direction shrinkage percentages here indicate machine direction growth. Positive machine direction shrinkages indicate shrinkage in the machine direction.

In certain embodiments of the present disclosure, the shrink films of this disclosure have shrinkage in the main shrinkage direction of from 50% or greater, or 60% or greater, or 70% or greater, when immersed in water at 95° C. for 10 seconds.

In certain embodiments of the present disclosure, the shrink films of this disclosure have shrinkage in the main shrinkage direction in the amount of 50 to 90% and shrinkage in the machine direction of 10% or less, or from −10% to 10%, when immersed in water at 95° C. for 10 seconds.

In one embodiment, the polyesters useful in the present disclosure are made into films using any method known in the art to produce films from polyesters, for example, solution casting, extrusion, compression molding, or calendering. The as-extruded (or as-formed) film is then oriented in one or more directions (e.g., monoaxially and/or biaxially oriented film). This orientation of the films can be performed by any method known in the art using standard orientation conditions. For example, the monoaxially oriented films of the present disclosure can be made from films having a thickness of about 100 to 400 microns, such as, extruded, cast or calendered films, which can be stretched at a ratio of 6.5:1 to 3:1 at a temperature of from the Tg of the film to the Tg+55° C., and which can be stretched to a thickness of 20 to 80 microns. In one embodiment, the orientation of the initial as extruded film can be performed on a tenter frame according to these orientation conditions.

In certain embodiments of the present disclosure, the shrink films of this disclosure can have a break strain percentage greater than 200% at a stretching speed of 500 mm/minute in the direction orthogonal to the main shrinkage direction according to ASTM Method D882.

In certain embodiments of the present disclosure, the shrink films of this disclosure can have a break strain percentage of greater than 300% at a stretching speed of 500 mm/minute in the direction orthogonal to the main shrinkage direction according to ASTM Method D882.

In certain embodiments of the present disclosure, the shrink films of this disclosure can have a tensile stress at break (break stress) of from 20 to 400 MPa; or 40 to 260 MPa; or 42 to 260 MPa as measured according to ASTM Method D882.

In certain embodiments of the present disclosure, the shrink films of this disclosure can have a shrink force of from 4 to 18 MPa, or from 4 to 15 MPa, as measured by ISO Method 14616 depending on the stretching conditions and the end-use application desired. For example, certain labels made for plastic bottles can have an MPa of from 4 to 8 and certain labels made for glass bottles can have a shrink force of from 10 to 14 Mpa as measured by ISO Method 14616 using a LabThink FST-02 Thermal Shrinkage Tester and reported in units of MPa.

In one embodiment of the present disclosure, the polyester compositions can be formed by reacting the monomers by known methods for making polyesters in what is typically referred to as reactor grade compositions.

Molded articles can also be manufactured from any of the polyester compositions disclosed herein which may or may not consist of or contain shrink films and are included within the scope of the present disclosure.

In one embodiment, when having a pre-oriented thickness of about 100 to 400 microns followed by orientation on a tenter frame at from a ratio of 6.5:1 to 3:1 at a temperature of from Tg to Tg+55° C. to a thickness of from about 20 to about 80 microns, the shrink films of the present disclosure can have one or more of the following properties: (1) shrinkage in the main shrinkage direction or transverse direction in the amount of greater than 60% (or greater than 70%), and 10% or less (or from −5% to 4%) shrinkage in the machine direction when immersed in water at 95° C. for 10 seconds; (2) an onset of shrinkage temperature of from about 55° C. to about 70° C.; (3) a break strain percentage of greater than 200% at stretching speeds of 500 mm/minute, or 200 to 600%, or 200 to 500%, or 226 to 449%, or 250 to 455% in the transverse direction or in the machine direction or in both directions according to ASTM Method D882; (4) no more than 40% shrinkage per each 5° C. temperature increase increment; and/or (5) strain induced crystalline melting point greater than or equal to 200° C. Any combination of these properties or all of these properties can be present in the shrink films of this disclosure. The shrink films of the present disclosure can have a combination of two or more of the above described shrink film properties. The shrink films of the present disclosure can have a combination of three or more of the above described shrink film properties. The shrink films of the present disclosure can have a combination of four or more of the above described shrink film properties. In certain embodiments, properties (1)-(2) are present. In certain embodiments, properties (1)-(5) are present. In certain embodiments, properties (1)-(3) are present, etc.

The shrinkage percentages herein are based on initial as-formed films having a thickness of about 20 to 80 microns that have been oriented at a ratio of from 6.5:1 to 3:1 at a temperature of Tg to Tg+55° C. on a tenter frame, for example, at a ratio of 5:1 at a temperature from 70° C. to 85° C. In one embodiment, the shrinkage properties of the oriented films used to make the shrink films of this disclosure were not adjusted by annealing the films at a temperature higher than the temperature in which it was oriented.

The shape of the films useful in making the oriented films or shrink films of the present disclosure is not restricted in any way. For example, it may be a flat film or a film that has been formed into a tube. Films formed into a tube may use a seaming solvent or a seaming adhesive to bond or hold the edges of the film together during shrinking. In order to produce the shrink films useful in the present disclosure, the polyester is first formed into a flat film and then is "uniaxially stretched", meaning the polyester film is oriented in one direction. The films could also be "biaxially oriented," meaning the polyester films are oriented in two different directions; for example, the films are stretched in both the machine direction and a direction different from the machine direction. Typically, but not always, the two directions are substantially perpendicular. For example, in one embodiment, the two directions are in the longitudinal or machine direction ("MD") of the film (the direction in which the film is produced on a film-making machine) and the transverse direction ("TD") of the film (the direction perpendicular to the MD of the film). Biaxially oriented films may be sequentially oriented, simultaneously oriented, or oriented by some combination of simultaneous and sequential stretching.

The films may be oriented by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. In one embodiment, stretching of the films is done by preliminarily heating the films 5° C. to 80° C. above their glass transition temperature (Tg). In one embodiment, the films can be preliminarily heated from 5° C. to 30° C. above their Tg. In one embodiment, the stretch rate is from 0.5 to 20 inches (1.27 to 50.8 cm) per second. Next, the films can be oriented, for example, in either the machine direction, the transverse direction, or both directions from 2 to 6 times the original measurements. The films can be oriented as a single film layer or can be coextruded with another polyester such as PET (polyethylene terephthalate) as a multilayer film and then oriented.

In one embodiment, the present disclosure includes an article of manufacture or a shaped article comprising the shrink films of any of the shrink film embodiments of this disclosure. In another embodiment, the present disclosure includes an article of manufacture or a shaped article comprising the oriented films of any of the oriented film embodiments of this disclosure.

In certain embodiments, the present disclosure includes but is not limited to shrink films applied to containers, plastic bottles, glass bottles, packaging, batteries, hot fill containers, and/or industrial articles or other applications. In one embodiment, the present disclosure includes but is not limited to oriented films applied to containers, packaging, plastic bottles, glass bottles, photo substrates such as paper, batteries, hot fill containers, and/or industrial articles or other applications.

In certain embodiments of the present disclosure, the shrink films of this disclosure can be formed into a label or sleeve. The label or sleeve can then be applied to an article of manufacture, such as, the wall of a container, battery, or onto a sheet or film.

The oriented films or shrink films of the present disclosure can be applied to shaped articles, such as, containers, tubes or bottles and are commonly used in various packaging applications. For example, films and sheets produced from polymers such as polyolefins, polystyrene, poly(vinyl chloride), polyesters, polylactic acid (PLA) and the like are used frequently for the manufacture of shrink labels for plastic beverage or food containers. For example, the shrink films of the present disclosure can be used in many packaging applications where the shrink film applied to the shaped article exhibits properties, such as, good printability, good shrink force, good texture, high shrinkage, controlled shrink rate, good stiffness, and recyclability.

The improved shrink properties as well as recyclability offer new commercial options, including but not limited to, shrink films applied to containers, plastic bottles, glass bottles, packaging, batteries, hot fill containers, and/or industrial articles or other applications.

The following examples further illustrate how the copolyester compositions of the present disclosure can be made into recyclable articles and evaluated, and they are intended to be purely exemplary and are not intended to limit the scope thereof. Unless indicated otherwise, parts are parts by weight, temperature is in degrees C. (Celsius) or is at room temperature, and pressure is at or near atmospheric.

Examples

This disclosure can be further illustrated by the following examples of preferred embodiments thereof, although it will be understood that these examples are included merely for purposes of illustration and are not intended to limit the scope of the disclosure unless otherwise specifically indicated.

In one embodiment of the present disclosure, based on the average thickness of the lids to be produced, a predication can be made of the maximum fill length of the mold. For example, if the average thickness of the lid is 0.3 mm, the predicted max fill length based on the length to thickness ratio (l/t ratio) of 150 is 45 mm and based on the l/t ratio of 100 is 30 mm.

| Injection Molding Predictions | | |
| --- | --- | --- |
| Thickness-average thickness of the lid | Predicted max fill length based on l/t = 150 | Predicted max fill length based on l/t = 100 |
| 0.3 mm | 45 mm | 30 mm |
| 0.4 mm | 60 mm | 40 mm |
| 0.5 mm | 75 mm | 50 mm |
| 0.75 mm | 112.5 mm | 75 mm |
| 1.0 mm | 150 mm | 100 mm |
| 1.25 mm | 187.5 mm | 125 mm |
| 1.5 mm | 225 mm | 150 mm |

In one embodiment, it was surprisingly discovered that at certain lower levels of CHDM the strength value, or the number of cycles before the living hinge failed, was increased. The strength values were measured by manually flexing the living hinge of the reclosable lid. The hinge was flexed by fully opening the lid to 180 degrees and folding the hinge until the lid was at the closing point (but it was not snapped shut). The flexing of the living hinge was continued manually until the hinge failed. One cycle is one rotation of fully opening and closing the lid. At some higher levels of CHDM (eg 75 mole % CHDM), the living hinges failed after only a few cycles. But, at some lower levels of CHDM the living hinges did not fail even after more than 3000 cycles (note the test was ended for some samples before the failure point was reached). The polyester compositions evaluated, samples 1-9, in these tests were samples of CHDM modified PET compositions. In one embodiment, suitable living hinges have strength values of at least 300 cycles. In one embodiment, suitable living hinges have strength values of at least 500 cycles. In one embodiment, suitable living hinges have strength values of at least 600 cycles. In some embodiments, suitable living hinges have strength values of at least 1000 cycles. Samples 9 and 10 are samples modified with isophthalic acid. These samples met the requirement of having strength values of at least 500 cycles, and the lower level of modification performed better with a higher strength value.

| | CHDM mole % | Average Strength Value (number of Cycles) |
|---|---|---|
| Sample 1 | 3.5 | 3000+ |
| Sample 2 | 4.5 | 1620 |
| Sample 3 | 4.5 | 1490 |
| Sample 4 | 11 | 645 |
| Sample 5 | 11 | 900 |
| Sample 6 | 31 | 342 |
| Sample 7 | 62 | 81 |
| Sample 8 | 75 | 19 |
| Sample 9 (88.3 mol % PTA, 11.7 mol % isophthalic acid, 97.3 mol % EG, 2.7 mol % DEG) | 0 | 589 |
| Sample 10 90.5 mol % PTA, 9.5 mol % isophthalic acid, 98.2 mol % EG, 1.8 mol % DEG | 0 | 714 |

Samples 1-8 are manufactured by and available from Eastman Chemical Company and Sample 9-10 are available from Bell Polyester (IP21B and IP25B).

What is claimed:

1. A process for producing three-component recyclable article comprising

A) producing component A—a reclosable lid with a living hinge as a single component by injection molding at least one polyester using a mold with one or more injection points wherein the average polyester flow length divided by the average thickness of the lid is below 200;

wherein at least one polyester comprises:
  (a) a dicarboxylic acid component comprising:
    (i) 88 to 100 mole % of terephthalic acid residues;
    (ii) 0 to 12 mole % of aromatic and/or aliphatic dicarboxylic acid residues having up to 20 carbon atoms; and
  (b) a glycol component comprising:
    (i) 88 to 100 mole % of ethylene glycol residues; and (ii) 0 to 12 mole % of 1,4-cyclohexanedimethanol residues;

wherein the total mole % of the acid residues is 100 mole %, and the total mole % of the glycol residues is 100 mole %;

wherein the inherent viscosity (IhV) of said polyester ranges from 0.60 to 1.1 dL/g as determined in 60/40 (wt/wt) phenol/tetrachloroethane at a concentration of 0.25 g/50 ml at 25° C.; and wherein the melting point temperature ($T_m$) of said polyester ranges from 225 to 255° C. as determined by ASTM D3418 at a scan rate of 10° C./min;

B) producing component B—a container by injection stretch blow molding at least one polyester; wherein at least one polyester comprises:
  (a) a dicarboxylic acid component comprising:
    (i) 88 to 100 mole % of terephthalic acid residues;
    (ii) 0 to 12 mole % of aromatic and/or aliphatic dicarboxylic acid residues having up to 20 carbon atoms; and
  (b) a glycol component comprising:
    (i) 88 to 100 mole % of ethylene glycol residues; and
    (ii) 0 to 12 mole % of 1,4-cyclohexanedimethanol residues; and
  (c) optionally at least one branching agent in the amount ranging from 0.1 to 1.0 mole % based on the total moles of glycol residues if said branching agent has hydroxyl substituents and otherwise based on the total moles of acid residues;

wherein the total mole % of the acid residues is 100 mole %, and the total mole % of the glycol residues is 100 mole %;

wherein the inherent viscosity (IhV) of said polyester ranges from 0.60 to 1.1 dL/g as determined in 60/40 (wt/wt) phenol/tetrachloroethane at a concentration of 0.25 g/50 ml al 25° C.; and wherein the melting point temperature ($T_m$) of said polyester ranges from 225 to 255° C. as determined by ASTM D3418 at a scan rate of 10° C./min and C) producing component C—a heat shrinkable film or label from at least one crystallizable resin which comprises a polyester composition comprising: at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    about 75 mole % or greater of ethylene glycol residues and
    about 25 mole % or less of other glycols comprising one or more of:
      (i) about 0.1 to less than about 24 mole % of neopentyl glycol residues;
      (ii) 0 to less than about 24 mole % of 1,4-cyclohexanedimethanol residues;
      (iii) about 1 to less than about 10 mole % of total diethylene glycol residues in the final polyester composition;

wherein the total mole % of the dicarboxylic acid component is 100 mole %, and wherein the total mole % of the diol component is 100 mole %; or C') producing component C'—a heat shrinkable film or label from at least one crystallizable resin which comprises a blend of polyester compositions comprising:

(1) 5-80% of at least one crystallizable polyester which comprises:

(a) a dicarboxylic acid component comprising:

(i) about 70 to about 100 mole % of terephthalic acid residues;

(ii) about 0 to about 30 mole % of aromatic and/or aliphatic dicarboxylic acid residues having up to 20 carbon atoms; and a diol component chosen from either (b) or (b'), wherein (b) is a diol component comprising:

about 75 mole % or greater of ethylene glycol residues and about 25 mole % or less of other glycols comprising one or more of:

(i) about 0 to less than about 25 mole % of neopentyl glycol residues;

(ii) about 0 to less than about 25 mole % of 1,4-cyclohexanedimethanol residues;

(iii) about 0 to less than about 10 mole % of total diethylene glycol residues in the final polyester composition;

wherein the total mole % of the dicarboxylic acid component is 100 mole %, and wherein the total mole % of the diol component is 100 mole %; or wherein (b') is a diol component comprising:

about 75 mole % or greater of ethylene glycol residues and about 25 mole % or less of other glycols comprising one or more of:

(i) about 0.1 to less than about 24 mole % of neopentyl glycol residues;

(ii) about 0.1 to less than about 24 mole % of 1,4-cyclohexanedimethanol residues;

(iii) about 1 to less than about 10 mole % of total diethylene glycol residues in the final polyester composition;

wherein the total mole % of the dicarboxylic acid component is 100 mole %, and wherein the total mole % of the diol component is 100 mole %; and (2) 20-95% of at least one amorphous polyester which comprises:

(a) a dicarboxylic acid component comprising:

(i) about 70 to about 100 mole % of terephthalic acid residues;

(ii) about 0 to about 30 mole % of aromatic and/or aliphatic dicarboxylic acid residues having up to 20 carbon atoms; and (b) a diol component comprising:

about 60 mole % or greater of ethylene glycol residues and about 40 mole % or less of other glycols comprising one or more of:

(i) about 0 to less than about 40 mole % of neopentyl glycol residues;

(ii) about 0 to less than about 40 mole % of 1,4-cyclohexanedimethanol residues;

(iii) about 0 to less than about 15 mole % of total diethylene glycol residues in the final polyester composition, whether or not formed in situ;

wherein the total mole % of the dicarboxylic acid component is 100 mole %, and wherein the total mole % of the diol component is 100 mole %; and wherein (1) and (2) are different.

2. The process of claim 1, further comprising attaching component A—the lid to component B—the container and affixing component C—the film or label onto component B—the container or onto a portion of component B—the container and a portion of component A—the attached lid.

3. The process of claim 1, wherein in A) the average polyester flow length divided by the average thickness of component A—the lid is below 175; or wherein in A) the average polyester flow length divided by the average thickness of component A—the lid is below 150, or wherein in A) the average polyester flow length divided by the average thickness of component A—the lid is below 100.

4. The process of claim 1, wherein in A) the mold has one injection point; or wherein in A) the mold has two injection points.

5. The process of claim 1, wherein all three components-component A—the lid, component B—the container and component C—the film are transparent and/or clear and recyclable in a PET recycle stream.

6. The process of claim 1, wherein component A—the lid produced in A) has an average thickness of from 0.5-2 mm.

7. The process of claim 1, wherein component A—the lid produced in A) has a living hinge with an average thickness of from 0.1-1 mm.

8. The process of claim 1, wherein the polyester of component A has 0 to mole % of 1,4-cyclohexanedimethanol residues.

9. The process of claim 1, wherein the polyester of component A has 0.1 to 10 mole % of 1,4-cyclohexanedimethanol residues.

10. The process of claim 1, wherein the living hinge of component A has a strength value of at least 500 cycles; or has a strength value of at least 700 cycles; or has a strength value of at least 600 cycles; or has a strength value of at least 1000 cycles.

11. The process of claim 1, wherein the inherent viscosity (IhV) of polyester in component A or component B ranges from 0.60 to 0.8 dL/g.

12. The process of claim 1, further comprising at least one polyester with recycle content in component A and/or component B and/or component C.

13. The process of claim 1, wherein the inherent viscosity of the polyester for component C—the film or label is from 0.68 to 0.75 dL/g as determined in 60/40 (wt/wt) phenol/tetrachloroethane at a concentration of 0.5 g/dl at 25° C., and wherein the polyester has a Tg of from 72° C. to 77° C. as determined using a TA DSC 2920 from Thermal Analyst Instrument at a scan rate of 20° C./min.

14. The process of claim 1, wherein for component C—the film or label the sum of the diol content of one or more diol monomer components capable of forming an amorphous component in the final polyester is from 10 to 20 mole % wherein the total diol content is 100 mole %; or wherein the sum of the diol content of one or more diol monomer components capable of forming an amorphous component in the final polyester is from 15 to 20 mole % wherein the total diol content is 100 mole %.

15. The process of claim 1, wherein for component C—the film or label the 1,4-cyclohexanedimethanol residues are present in the amount of 0 to 5 mole %, diethylene glycol residues are present in the amount of 5 mole % or less, neopentyl glycol residues in the amount of 10 to 15 mole %, and ethylene glycol residues are present in the amount of greater than 75 mole %.

16. The process of claim 1, wherein for component C—the film or label said film is stretched in at least one direction; or wherein said film is oriented in one or more directions; or wherein said film is stretched and oriented in at least one direction; or wherein said film is annealed or wherein said film is annealed at a temperature from about 75° C. to about 110° C.

17. The process of claim 1, wherein for component C—the film or label said film is stretched in at least one direction and the stretched film has a strain induced crystalline melting point of 200° C. or greater.

18. The process of claim 1, wherein for component C—the film or label said film has shrinkage in the main shrinkage direction of from 60% or greater when immersed in water at 85° C. for 10 seconds.

19. The process of claim 1, wherein for component C—the film or label said film has a shrink force of 5 MPa or greater.

20. The process of claim 1, wherein for component C—the film or label said film has a shrinkage in the main shrinkage direction in the amount of 50 to 90% and shrinkage in the direction orthogonal to the main shrinkage direction of 10% or less when immersed in water at 95° C. for 10 seconds.

* * * * *